US012698845B2

(12) United States Patent
Zhang et al.

(10) Patent No.: US 12,698,845 B2
(45) Date of Patent: Aug. 4, 2026

(54) FLUID CONTROL ASSEMBLY

(71) Applicant: ZHEJIANG SANHUA AUTOMOTIVE COMPONENTS CO., LTD., Hangzhou (CN)

(72) Inventors: Xiangyu Zhang, Hangzhou (CN); Yongxiang Tan, Hangzhou (CN); Longbin Li, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 0 days.

(21) Appl. No.: 18/860,024

(22) PCT Filed: Apr. 25, 2023

(86) PCT No.: PCT/CN2023/090472
§ 371 (c)(1),
(2) Date: Oct. 25, 2024

(87) PCT Pub. No.: WO2023/207935
PCT Pub. Date: Nov. 2, 2023

(65) Prior Publication Data
US 2025/0290574 A1 Sep. 18, 2025

(30) Foreign Application Priority Data

Apr. 25, 2022 (CN) ......................... 202210440504.X
Oct. 27, 2022 (CN) ......................... 202211325586.X

(51) Int. Cl.
*F16K 37/00* (2006.01)
*F16K 27/00* (2006.01)
*F16K 31/06* (2006.01)
(52) U.S. Cl.
CPC ........ *F16K 37/0025* (2013.01); *F16K 27/003* (2013.01); *F16K 31/0603* (2013.01)

(58) Field of Classification Search
CPC .............. F16K 37/0025; F16K 27/003; F16K 31/0603; F16K 31/06
See application file for complete search history.

(56) References Cited

U.S. PATENT DOCUMENTS 6,041,497 A * 3/2000 Nakagawa ......... H01R 13/2442
29/874
11,563,287 B2 * 1/2023 Reichert ............ H01R 13/2492
(Continued)

FOREIGN PATENT DOCUMENTS

CN 1069152 C 8/2001
CN 1854581 A 11/2006
(Continued)

OTHER PUBLICATIONS

Translation of DE 19518519 retrieved from espacenet.com (Year: 2025).*
(Continued)

*Primary Examiner* — Jessica Cahill
(74) *Attorney, Agent, or Firm* — Yue (Robert) Xu; Apex Attorneys at Law, LLP

(57) ABSTRACT

A fluid control assembly is provided. A connecting member comprises a flexible section and a rigid section; a stator assembly comprises a coil assembly and a first connecting portion; a coil of the coil assembly is electrically connected to the first connecting portion; a circuit board comprises a second connecting portion; the rigid section comprises a first section, the first section being electrically connected to the first connecting portion, and/or the rigid section comprises a second section, the second section being electrically connected to the second connecting portion; the flexible section may absorb a deformation amount difference between the stator assembly and the circuit board.

11 Claims, 12 Drawing Sheets

(56) References Cited

U.S. PATENT DOCUMENTS

| | | | | |
|---|---|---|---|---|
| 12,392,420 | B2 * | 8/2025 | Hosaka | F16K 31/046 |
| 2002/0127910 | A1 * | 9/2002 | Loibl | F16K 31/06 |
| | | | | 439/577 |
| 2007/0241298 | A1 | 10/2007 | Herbert et al. | |
| 2018/0299029 | A1 * | 10/2018 | Uehara | H02K 5/128 |
| 2021/0254742 | A1 | 8/2021 | Zhang et al. | |
| 2022/0196172 | A1 * | 6/2022 | Yoshida | B29C 66/81267 |

FOREIGN PATENT DOCUMENTS

| | | |
|---|---|---|
| CN | 208900796 U | 5/2019 |
| CN | 110608308 A | 12/2019 |
| CN | 111503344 A | 8/2020 |
| CN | 111911697 A | 11/2020 |
| CN | 213846345 U | 7/2021 |
| CN | 216200581 U | 4/2022 |
| DE | 19518519 A1 * | 11/1996 | H05K 7/14 |
| DE | 102017209626 A1 | 12/2018 |
| EP | 1698817 A2 | 9/2006 |
| EP | 3754815 A1 | 12/2020 |
| EP | 4089306 A1 | 11/2022 |
| JP | 2019146299 A | 8/2019 |
| JP | 2021110395 A | 8/2021 |
| JP | 2022014198 A | 1/2022 |
| WO | 2020203007 A1 | 10/2020 |

OTHER PUBLICATIONS

International Search Report for PCT/CN2023/090472 mailed Jul. 14, 2023, ISA/CN.

Japanese first Office Action issued on Sep. 9, 2025 for the Japanese counterpart application No. 2024-560846.

European Search Report issued on Mar. 31, 2026 for European counterpart application No. 23795368.2.

\* cited by examiner

142

17/171/1701

141/1414

152/1521

142

17/171/1701

17/171/1702

141/1414

B-B

FLUID CONTROL ASSEMBLY

The present disclosure is a national phase application of PCT international patent application PCT/CN2023/090472, filed on Apr. 25, 2023 which claims the priorities to Chinese Patent Applications No. 202211325586.X, titled "FLUID CONTROL ASSEMBLY", filed with the China National Intellectual Property Administration on Oct. 27, 2022, and No. 202210440504.X, titled "FLUID CONTROL DEVICE", filed with the China National Intellectual Property Administration on Apr. 25, 2022, the entire disclosures of which are incorporated herein by reference.

FIELD

The present disclosure relates to the technical field of fluid control, and in particular to a fluid control assembly.

BACKGROUND

A fluid control assembly includes a valve component. In particular, when the fluid control assembly includes multiple valve components, stator assemblies of the multiple valve components are arranged in one single control box, and are electrically connected to one single circuit board through pins. As the control box has a relatively large size, the stability of the connection between the pins and the stator assemblies or the connection between the pins and the circuit board may be decreased due to a difference between coefficients of thermal expansion of the connected components.

SUMMARY

An object of the present disclosure is to provide a fluid control assembly, which increases the stability of a connection between a stator assembly and a circuit board.

To achieve the above object, the following technical solutions are provided according to an embodiment of the present disclosure.

A fluid control assembly includes a control portion, where the control portion includes a circuit board, a stator assembly, and a connector;

the connector includes a flexible segment and a rigid segment, and the flexible segment is electrically connected to the rigid segment;

the stator assembly includes a coil assembly and a first connecting portion, and a coil of the coil assembly is electrically connected to the first connecting portion;

the circuit board includes a second connecting portion, where the rigid segment includes a first segment, and the first segment is electrically connected to the first connecting portion, and/or the rigid segment includes a second segment, and the second segment is electrically connected to the second connecting portion.

The fluid control assembly is provided according to the embodiment of the present disclosure. The connector includes the flexible segment and the rigid segment. The stator assembly includes the coil assembly and the first connecting portion, and the coil of the coil assembly is electrically connected to the first connecting portion. The circuit board includes the second connecting portion. The rigid segment includes the first segment being electrically connected to the first connecting portion, and/or the rigid segment includes the second segment being electrically connected to the second connecting portion. The flexible segment can absorb a difference between deformations of the stator assembly and the circuit board, and the rigid segment can prevent a thermal stress from being transmitted from the flexible segment to the electrical connection, thereby improving the stability of the electrical connection between the stator assembly and the circuit board.

Figure 1:
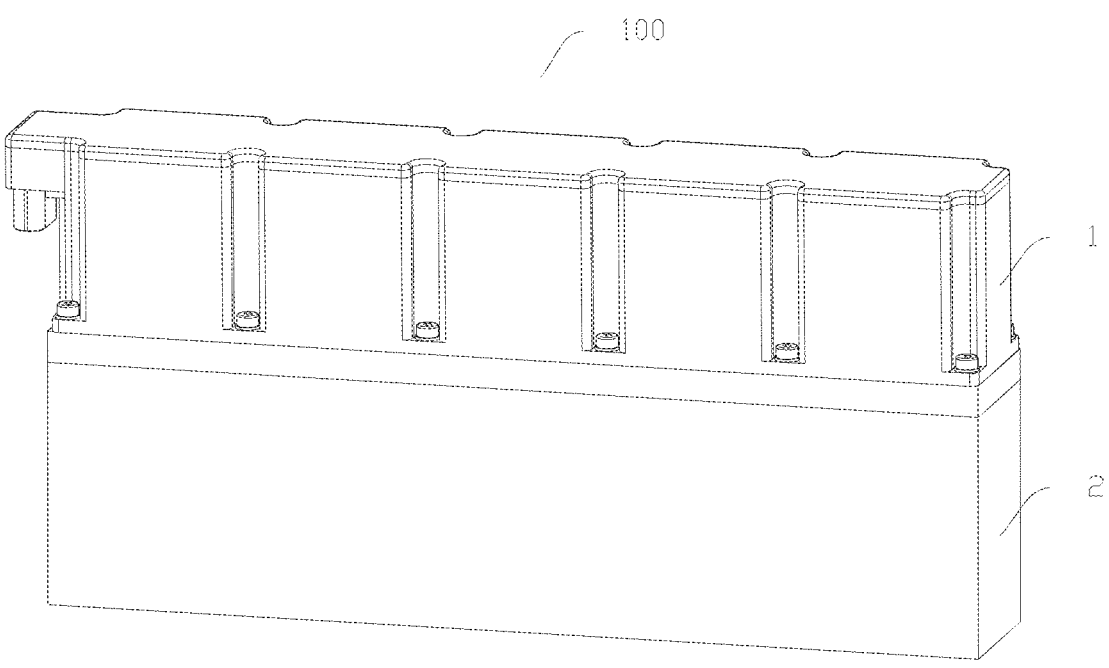
FIG. 1 is a schematic perspective view showing a fluid control assembly according to an embodiment of the present disclosure.

| Reference numerals: | | | |
|---|---|---|---|
| 100 | fluid control assembly, | 1 | control portion, |
| 2 | flow passage plate assembly, | 3 | valve component, |

-continued

| Reference numerals: | | | |
|---|---|---|---|
| 11 | housing, | 12 | sensor, |
| 13 | circuit board, | 14 | stator assembly, |
| 15 | connector, | 16 | positioning block, |
| 17 | protrusion portion, | 21 | mounting chamber, |
| 121 | third connecting portion, | 111 | accommodation chamber, |
| 112 | positioning portion, | 113 | positioning groove, |
| 114 | cover body, | 115 | main housing, |
| 131 | second connecting portion, | 141 | injection molded main body, |
| 143 | coil assembly, | 142 | first connecting portion, |
| 147 | induction chamber, | 1401 | first stator assembly, |
| 1402 | second stator assembly, | 1403 | third stator assembly, |
| 1404 | fourth stator assembly, | 1405 | fifth stator assembly, |
| 1410 | mounting portion, | 1411 | first injection molded main body, |
| 1414 | fourth injection molded main body, | 14141 | first wall, |
| 14142 | fifth wall, | 14112 | sixth wall, |
| 151 | flexible segment, | 152 | rigid segment, |
| 1521 | first segment, | 1522 | second segment, |
| 1523 | third segment, | 1511 | fourth segment, |
| 1512 | fifth segment, | 1524 | second wall, |
| 161 | third wall, | 1525 | fourth wall, |
| 1528 | seventh wall, | 153 | first connecting hole, |
| 154 | second connecting hole, | 1531 | first hole, |
| 1532 | second hole, | 1533 | third hole, |
| 1541 | fourth hole, | 1542 | fifth hole, |
| 1543 | sixth hole, | 1544 | seventh hole, |
| 1701 | limiting portion, | 1702 | main body portion, |
| 171 | first protrusion portion, | 172 | second protrusion portion, |
| 173 | third protrusion portion, | 174 | fourth protrusion portion. |

DETAILED DESCRIPTION OF THE EMBODIMENTS

Features in various aspects and exemplary embodiments of the present disclosure are described in detail hereinafter. The present disclosure will be further described in detail as follows in conjunction with the accompany drawings and specific embodiments, so that purposes, technical solutions and advantages of the present disclosure can be more clear and obvious. Relational terms such as "first", "second" and the like herein are merely used to distinguish one component from another one having a same name, and do not necessarily require or imply any such actual relationship or order among these components.

A fluid control assembly can be applied to a thermal management system, which may be a vehicle thermal management system, such as a thermal management system for an electrical vehicle.

Figure 2:
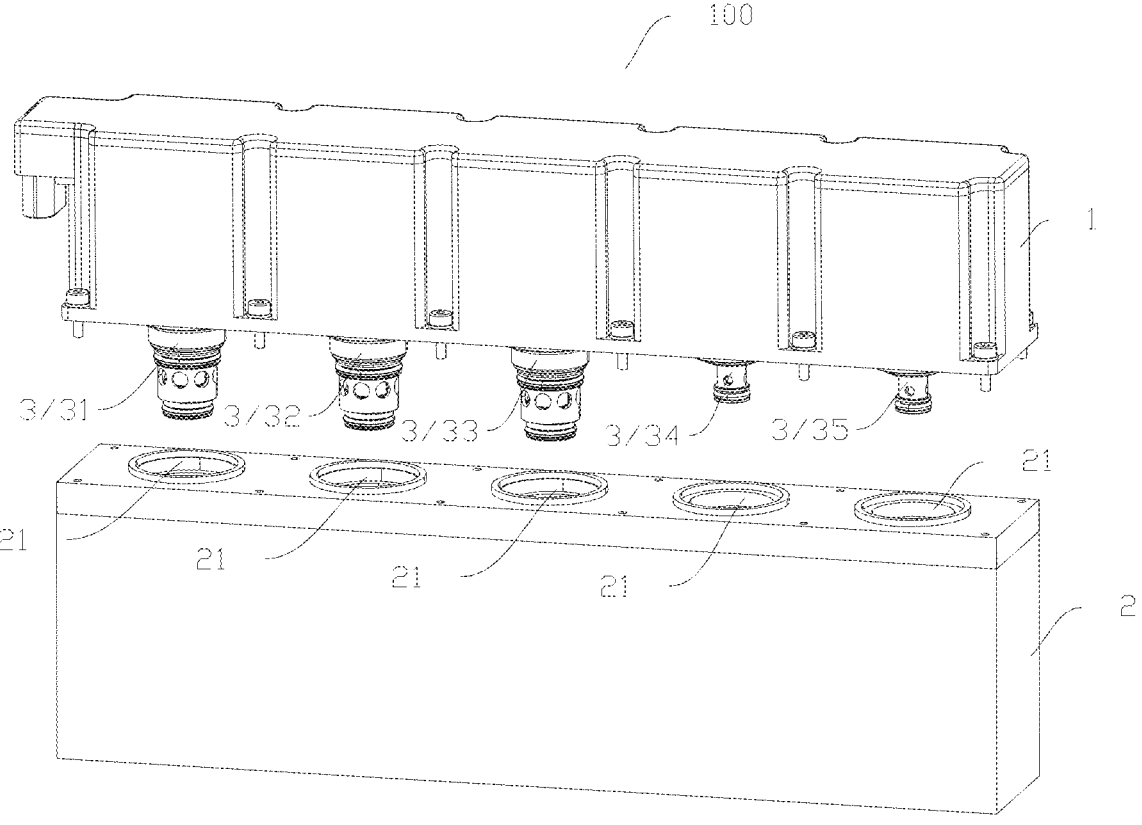
FIG. 2 is a schematic exploded view showing the fluid control assembly in FIG. 1.
Figure 3:
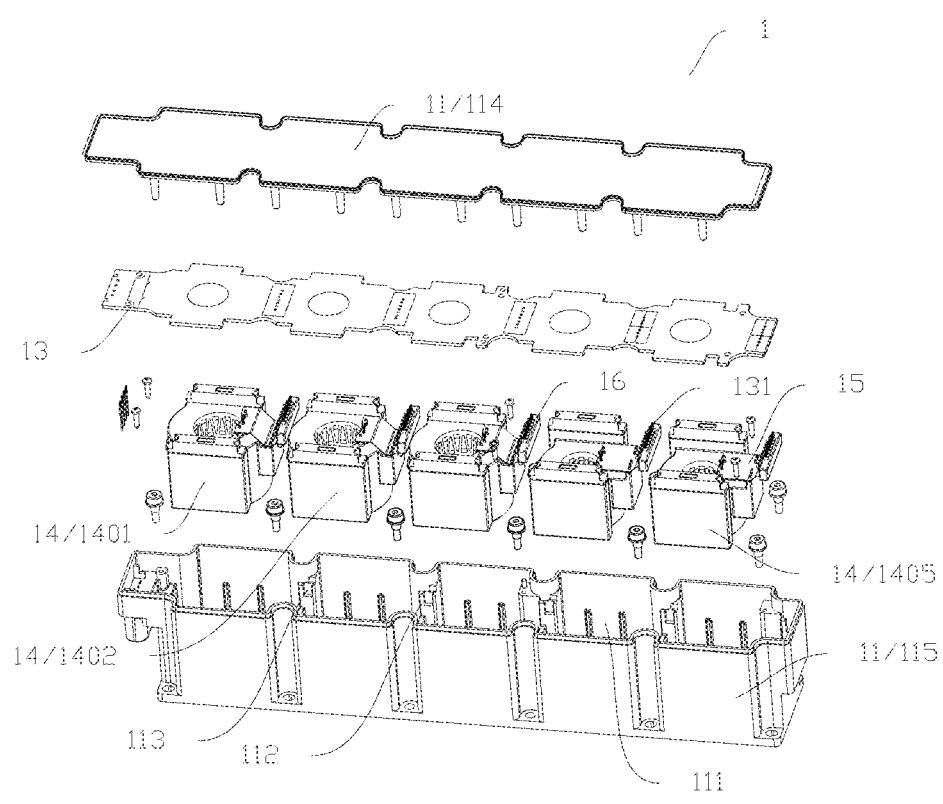
FIG. 3 is a schematic exploded view showing a control portion in FIG. 2.

As shown in FIG. 1 to FIG. 3, according to an embodiment of the present disclosure, a fluid control assembly 100 includes a control portion 1, a flow passage plate assembly 2, and a valve component 3. The control portion 1 and the flow passage plate assembly 2 are fixedly connected, connected in a limited manner, or sealedly connected with each other. For example, the fixed connection includes connections by welding, bonding, or abutting against each other, or by a bolt. It should be noted that, the fixed connection in the embodiment includes a direct connection and an indirect connection. In the embodiment, the control portion 1 and the flow passage plate assembly 2 are directly connected to each other by a bolt. The flow passage plate assembly 2 at least includes a flow passage plate, and the flow passage plate is provided with a mounting chamber 21 and a flow passage. At least a part of the valve component 3 is located inside the mounting chamber 21, and the valve component 3 and the flow passage plate assembly 2 are connected with each other in a fixed or limited manner. At least another part of the valve component 3 is located at the control portion 1. The control portion 1 includes a circuit board 13 used for controlling the valve component 3 to be opened or closed, or adjusting an opening degree of the valve component 3, so as to further adjust the flow passage of the flow passage plate assembly 2 to be or not in communication, or regulate a flow rate of a medium in the flow passage.

Figure 4:
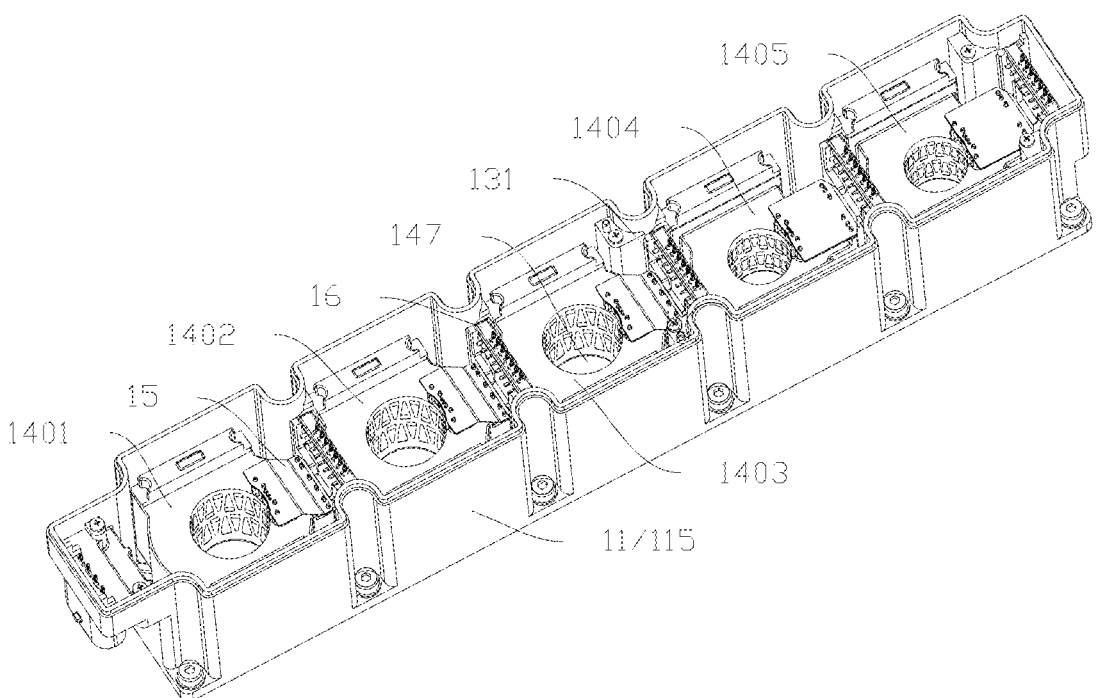
FIG. 4 is a schematic view showing connections of a part of structures of the control portion in FIG. 3.
Figure 5:
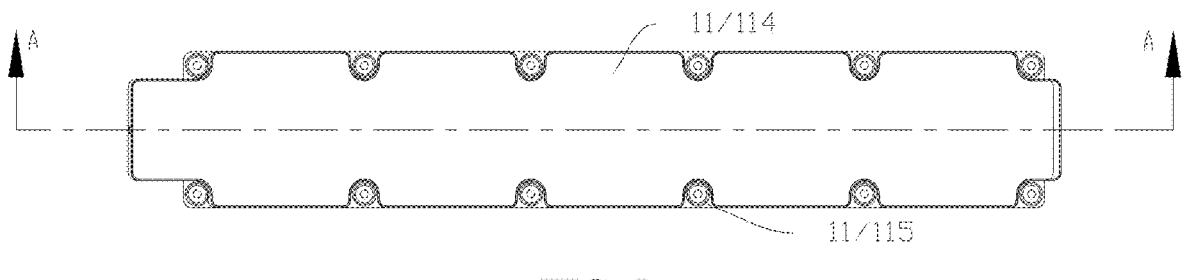
FIG. 5 is a schematic top view showing the structure of the control portion in FIG. 1.
Figure 7:
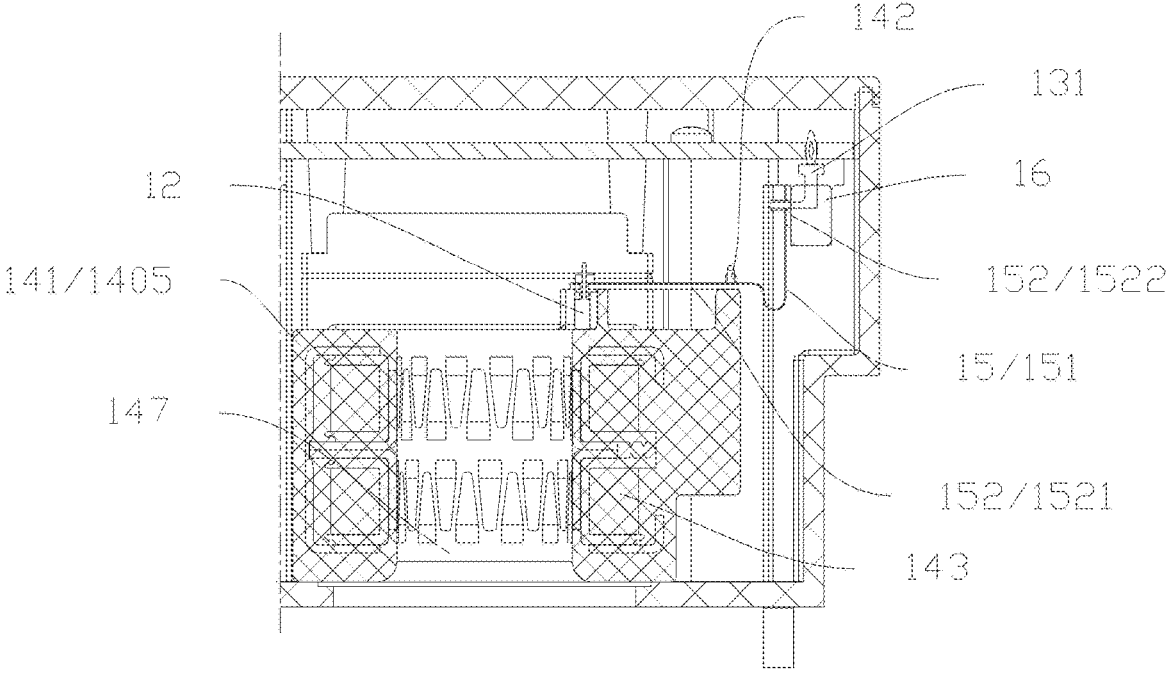
FIG. 7 is a schematic partial structural view of FIG. 6.

As shown in FIG. 3, FIG. 4, and FIG. 7, the control portion 1 includes a housing 11, a sensor 12, the circuit board 13, a stator assembly 14, and a connector 15. The control portion 1 is provided with an accommodation chamber 111, and an inner wall of the housing 11 forms a wall of the accommodation chamber 111. In the embodiment, the housing 11 includes a cover body 114 and a main housing 115, and the main housing 115 and the cover body 114 are connected with each other in a fixed or limited manner. The accommodation chamber 111 is formed by the main housing 115 and the cover body 114. In other embodiments, the main housing 115 and the cover body 114 may form a part of the accommodation chamber 111, or the main housing 115 and the cover body 114 are in an integrated structure. The circuit board 13 and the stator assembly 14 are located inside the accommodation chamber 111. The connector 15 is fixedly connected to the circuit board 13 and the stator assembly 14, respectively, and the connector 15 is electrically connected to the circuit board 13 and the stator assembly 14, respectively. The circuit board 13 is connected with the housing 11 in a fixed or limited manner, or, the circuit board 13 is connected with the stator assembly 14 in a fixed or limited manner. In the embodiment, the circuit board 13 is fixedly connected with the main housing 15 through a screw, and the stator assembly 14 is connected with the housing 11 in a fixed or limited manner. For example, the stator assembly 14 may be fixedly connected with the housing 11 by snap-fit, abutting against with each other, or interference fit, or by a screw. The sensor 12 is connected with the stator assembly 14 in a fixed or limited manner. The sensor 12 may be fixed on the stator assembly 14 through a support, or directly connected to the stator assembly 14 by snap-fit. The stator assembly 14, the connector 15, the circuit board 13, and the sensor 12 are all located inside the accommodation chamber 111 of the housing 11 to ensure a waterproof and dustproof performance of the housing 11, thereby ensuring the performance of all electrical components inside the housing 11.

Multiple valve components 3 may be provided. The valve components 3 may be solenoid valves, or throttle valves, or any combination of the solenoid valve and the throttle valve. Each valve component 3 is arranged to corresponding to the respective stator assembly 14, and the multiple stator assemblies 14 are located inside the accommodation chamber 111. A bottom wall of the multiple stator assemblies 14 is in contact with an inner bottom wall of the housing 11, and a side wall of the multiple stator assemblies 14 abuts against an inner side wall of the housing 11. The multiple stator assemblies 14 are connected with the housing 11 in a limited manner. Each stator assembly 14 is sleeved outside a periphery of a portion of the corresponding valve component 3, and each stator assembly 14 is electrically connected to the circuit board 13 through the corresponding connector 15. In the embodiment, the multiple valve components 3 include a first valve 31, a second valve 32, a third valve 33, a fourth valve 34, and a fifth valve 35. The first valve 31, the second valve 32, and the third valve 33 are solenoid valves, and the fourth valve 34, and the fifth valve 35 are throttle valves. These five valve components 3 are linearly arranged, and five mounting chambers 21 are located at a top of the flow passage plate assembly 2. The five valve components are in one-to-one correspondence to the five mounting chambers 21. Five stator assemblies 14 are provided, and each valve component 3 is in correspondence to the respective stator assembly 14. The five stator assemblies 14 include a first stator assembly 1401, a second stator assembly 1402, a third stator assembly 1403, a fourth stator assembly 1404, and a fifth stator assembly 1405. These five stator assemblies 14 are all located inside the accommodation chamber 111 of the control portion 1, and are linearly arranged inside the accommodation chamber 111. A size of the housing 11 is mainly determined by the arrangement of the multiple stator assemblies 14 inside the accommodation chamber 111. A size of the circuit board 13 is similar to a size of the housing 11 in a horizontal direction, and the circuit board 13 is arranged in parallel to a horizontal plane of the housing 1. The circuit board 13 may be electrically connected to the five connectors 15, and the circuit board 13 may be electrically connected to the five stator assemblies through the five connectors 15, respectively. The stator assemblies 14 of the multiple valve components 3 are accommodated inside the one single control portion 1, such that the integration of the control structure of the fluid control assembly 100 is achieved. Only one control portion 1 is required for waterproof and dustproof treatments, thereby reducing the cost and improving the efficiency. The multiple stator assemblies 14 are electrically connected to the one single circuit board 13, and therefore only one electrical interface is required on the circuit board 13 to be electrically connected to external equipment, which simplifies the electrical wiring of the fluid control assembly 100.

The structure of the stator assembly 14 is shown in FIG. 3 to FIG. 9. Each stator assembly 14 includes an injection molded main body 141, a coil assembly 143 and a first connecting portion 142. The injection molded main body 141 is formed by injection molding with at least a part of the coil assembly 143 and a part of the first connecting portion 12 as inserts. A coil of the coil assembly 143 is electrically connected to the first connecting portion 142. A top portion of the injection molded main body 141 is provided with a mounting portion 1410. Viewed from a top of the stator assembly 14, the mounting portion 1410 is substantially in a C-shaped structure. The sensor 12 and the injection molded main body 141 are connected with each other in a fixed or limited manner. The mounting portion 1410 is provided with a mounting groove, and the mounting groove is a recess portion of being mirror symmetry to the C-shaped structure. At least a part of the sensor 12 is located inside the mounting groove. The injection molded main body 141 and the housing 11 are connected with each other in a fixed or limited manner. For example, the injection molded main body 141 and the housing 11 may be fixedly connected to each other by snap-fit, abutting against each other, or interference fit, or by a screw. The stator assembly 14 is formed with an induction chamber 147, and the induction chamber 147 is a part of the accommodation chamber 111. Specifically, the coil assembly 143 encloses to form the induction chamber 147, and a part of the corresponding valve component 3 is located inside the induction chamber 147. The valve component 3 is controlled to be opened or closed according to an induction signal of the coil assembly 143.

The coil assembly 143 and the sensor 12 are connected to the circuit board 13 through the connector 15, respectively. Specifically, the first connecting portion 142 is electrically connected to the connector 15, such that the coil of the coil assembly 143 is electrically connected to the connector 15. The first connecting portion 142 is fixedly connected to the connector 15. The sensor 12 includes a third connecting portion 121, and the third connecting portion 121 is a signal transmission component of the sensor 12. At least a part of the third connecting portion 121 protrudes from an opening of the mounting groove, and is electrically connected to the connector 15. The circuit board 13 includes a second connecting portion 131. The second connecting portion 131 is electrically connected to the connector 15, and the second connecting portion 131 is connected to the connector 15 by welding. In the embodiment, the first connecting portion 142 is a pin, and the first connecting portion 142 is connected to the connector 15 by welding. In other embodiments, other electrical connection manners may be used. For example, a plug-in electrical connection is achieved by a joint of plug and socket. The third connecting portion 121 is also a pin, and the third connecting portion 121 is connected to the connector 15 by welding. In other embodiments, other electrical connections may be used. For example, the third connecting portion 121 is a press-fit pin, and is electrically connected to the connector 15 by a press fit. The second connecting portion 131 is a pin header, and the second connecting portion 131 is electrically connected to the connector 15 and the circuit board 13, respectively. One end of the second connecting portion 131 is connected to the connector 15 by welding. The other end of the second connecting portion 131 is a press-fit pin, and the other end of the second connecting portion 131 is connected to the circuit board 13 by a press fit. In other embodiments, the second connecting portion 131 and the circuit board 13 may be a in an one-piece structure or may be fixedly connected to each other. For example, the second connecting portion 131 may be directly led out from the circuit board 13, or may be connected to the circuit board 13 by welding, or may be plug-in electrically connected to the circuit board 13 by a plug.

As shown in FIG. 3 to FIG. 21, the connector 15 is a plate-like member. That is, a thickness of the connector 15 is much smaller than a length or a width of the connector 15. A part of a flexible plate is fixed to a rigid plate to form the connector 15. The connector 15 includes a flexible segment 151 and a rigid segment 152. The flexible segment 151 and the rigid segment 152 are electrically connected to each other, and the flexible segment 151 and the rigid segment 152 are in an integrated structure. The rigid segment 152 includes the rigid plate. As shown in FIG. 8 to FIG. 15, in the embodiment, the rigid segment 152 includes a first segment 1521 and a second segment 1522, and the flexible segment 151 is provided between the first segment 1521 and the second segment 1522. The first segment 1521 is electrically connected to the first connecting portion 142, and the second segment 1522 is electrically connected to the second connecting portion 131. In other embodiments, the rigid segment 152 may include only the first segment 1521 or only the second segment 1522.

As the environment temperature changes, a thermal expansion and contraction may occur on both the stator assembly 14 and the circuit board 13. Due to different materials, the stator assembly 14 and the circuit board 13 have different thermal expansion coefficients, leading to different deformations. Particularly, multiple valve components 3 are provided, which correspondingly results in a larger size of the control portion 1 or the circuit board 13. Therefore, the deformations are relatively large. In a case that the stator assembly 14 and the circuit board 13 are connected through a pin, the connection stability at the pin is relatively poor. In the embodiment, the connector 15 includes the flexible segment 151 and the rigid segment 152, and the rigid segment 152 includes the first segment 1521 being electrically connected to the first connecting portion 142, and/or the rigid segment 152 includes the second segment 1522 being electrically connected to the second connecting portion 131. The flexible segment 151 can absorb a thermal stress caused by a difference between deformations of the stator assembly 14 and the circuit board 13. The rigid segment 152 is of a rigid structure, which can prevent the thermal stress from being transmitted from the flexible segment 151 to the electrical connection, thereby improving the stability of the electrical connection between the stator assembly 14 and the circuit board 13.

Moreover, during mounting and operation of the fluid control assembly 100, a vibration caused by the environment inevitably occurs. The flexible segment 151 can absorb the vibration caused by the environment, and the rigid segment 152 blocks the vibration transmitted from the flexible segment 151, thereby improving the stability of the electrical connection between the stator assembly 14 and the circuit board 13.

An embodiment of the connection between the connector and the stator assembly is shown in FIG. 8 to FIG. 15. The fourth stator assembly 1404 and the fifth stator assembly 1405 are each connected to the corresponding connector 15 in a manner shown in FIG. 8 to FIG. 15. The fourth stator assembly 1404 is taken as an example to describe the connection relationship between the stator assembly 14 and the connector 15 hereinafter. The rigid segment 152 includes the first segment 1521 and the second segment 1522, and the flexible segment 151 is provided between the first segment 1521 and the second segment 1522. The fourth stator assembly 1404 includes a fourth injection molded main body 1414, and the fourth injection molded main body 1414 has a first wall 14141. At least a part of the first connecting portion 142 protrudes from the first wall 14141. The mounting portion 1410 has a fifth wall 14142, and the first wall 14141 and the fifth wall 14142 are a part of a top wall of the fourth injection molded main body 1414. At least a part of the third connecting portion 121 protrudes from the fifth wall 14142. The fifth wall 14142 and the first wall 14141 are arranged in a same orientation, and the fifth wall 14142 and the first wall 14141 are substantially in a same plane. Therefore, one single first segment 1521 can be fixedly connected to both the first connecting portion 142 and the third connecting portion 121. Signal transmissions between the sensor 12 and the circuit board 13 and between the coil assembly 143 and the circuit board 13 can be achieved by one single first segment 1521. The connector 15 has a simple structure, which is easy to assemble.

The fourth injection molded main body 1414 supports the first segment 1521. The first segment 1521 includes a second wall 1524. At least a part of the first wall 14141 is arranged towards at least a part of the second wall 1524, and at least a part of the first wall 14141 is in surface-to-surface contact with at least a part of the second wall 1524. At least a part of the fifth wall 14142 is arranged towards at least a part of the second wall 1524, and at least a part of the fifth wall 14142 is in surface-to-surface contact with at least a part of the second wall 1524. The rigid segment 152 is provided with a first connecting hole 153 passing through the rigid segment 152 along a thickness direction of the rigid segment 152. The first connecting hole 153 includes a first hole 1531 and a third hole 1533. At least a part of the first connecting portion 142 is located inside the first hole 1531, and at least a part of the third connecting portion 121 is located inside the third hole 1533. The first hole 1531 and the third hole 1533 are both provided in the first segment 1521. In the embodiment, the first connecting portion 142 is a row of pins, and the third connecting portion 121 is another row of pins. Correspondingly, the first hole 1531 is a row of holes, and the third hole 1533 is another row of holes. The first hole 1531 and the third hole 1533 are respectively arranged at two sides of the first segment 1521.

The fourth injection molded main body 1414 and the first segment 1521 are arranged towards with each other and are in surface-to-surface contact with each other. As such, the fourth injection molded main body 1414 can support the first segment 1521 more stably, which facilitates the fixation between the first connecting portion 142 and the first segment 1521 by welding, and facilitates the fixation between the third connecting portion 121 and the first segment 1521 by welding. The first connecting portion 142 protrudes from the first wall 14141, and the third connecting portion 121 of the sensor 12 protrudes from the fifth wall 14142, which is beneficial to positioning of the first segment 1521 and the fixation by welding.

The control portion 1 is further provided with a protrusion portion 17, and the protrusion portion 17 includes a first protrusion portion 171, a second protrusion portion 172, and a third protrusion portion 173. The rigid segment 152 is provided with a second connecting hole 154, and the second connecting hole 154 includes a fourth hole 1541, a fifth hole 1542, and a sixth hole 1543. A diameter of the protrusion portion 17 is smaller than a diameter of the second connecting hole 154. At least a part of the protrusion portion 17 is located inside the second connecting hole 154. The protrusion portion 17 and the rigid segment 152 are connected with each other in a fixed or limited manner. The number of the protrusion portion 17 may be one or more, and correspondingly, the number of the second connecting hole 154 may be one or more.

The first protrusion portion 171 and the third protrusion portion 173 are both provided on the fourth injection molded main body 1414, and the second protrusion portion 173 is provided on the mounting portion 1410 of the fourth injection molded main body 1414. The fourth hole 1541 and the sixth hole 1543 are provided on the first segment 1521. The fourth hole 1541 and the first hole 1531 are arranged in a same row, and the sixth hole 1543 and the third hole 1533 are arranged close to each other. The number of the first protrusion portion 171 is two, and the number of the third protrusion portion 173 is also two. Correspondingly, the number of the fourth hole 1541 is two, and the number of the sixth hole 1543 is two. The two fourth holes 1541 are respectively located at two sides of the fourth hole 1531 in a row, and the two sixth holes 1543 are respectively located at two sides of the third hole 1533 in another row. In other embodiments, when the number of the second connecting hole 154 is one or more, the one or more second connecting holes 154 may be located at a periphery of the first connecting hole 153. For example, in a case that one second connecting hole 154 is provided, the one second connecting hole 154 is located at a center of the multiple holes of the first connecting hole 153. In a case that three second connecting holes 154 are provided, the three second connecting holes 154 are located at the center and at two sides of the first connecting hole 153, respectively. The second connecting holes 154 may be interspersed among the first connecting holes 153. At least a part of each first protrusion portion 171 is located inside the corresponding fourth hole 1541, and at least a part of each third protrusion portion 173 is located inside the corresponding sixth hole 1543. The first segment 1521 of the rigid segment 152 are fixed on the fourth injection molded main body 1414 by the first protrusion portion 171 and the third protrusion portion 173.

Figure 8:
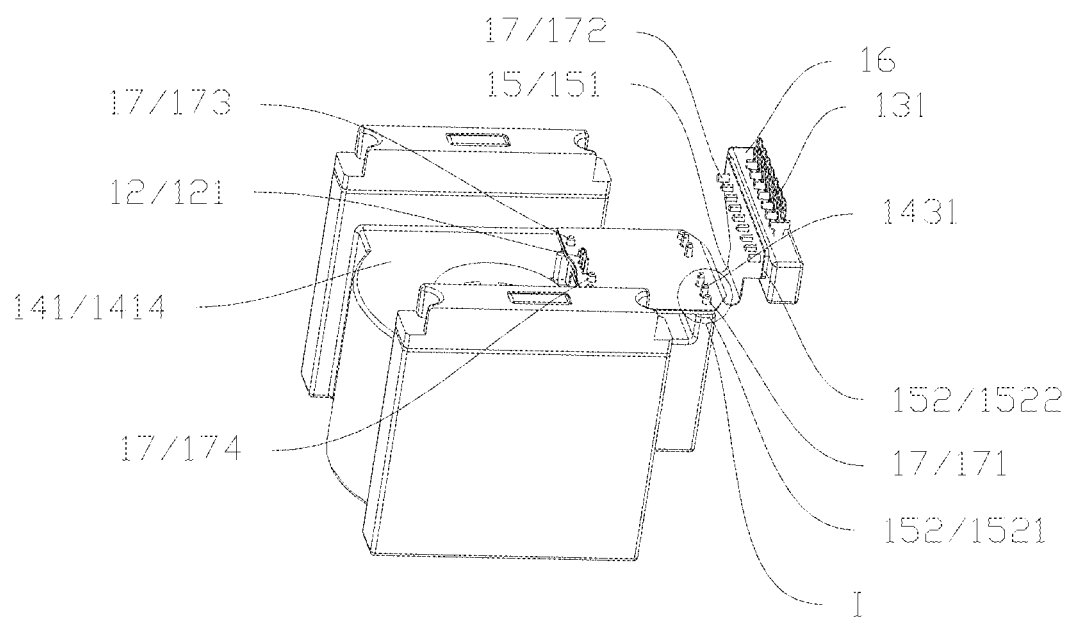
FIG. 8 is a schematic structural view showing a connector and a stator assembly in FIG. 4.
Figure 9:
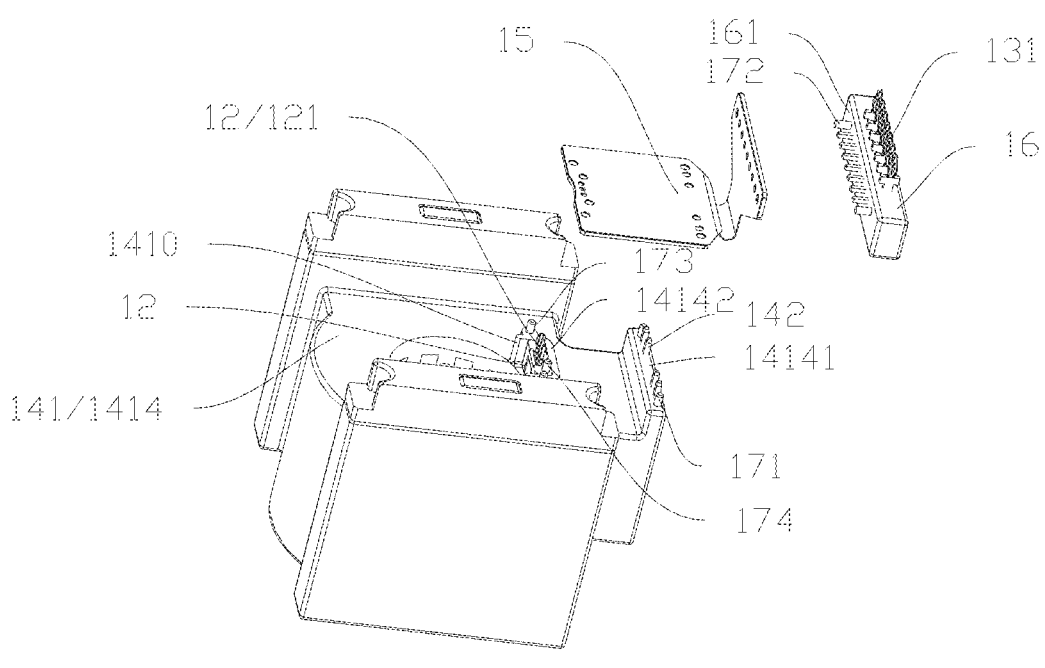
FIG. 9 is a schematic exploded view of FIG. 8.
Figure 10:
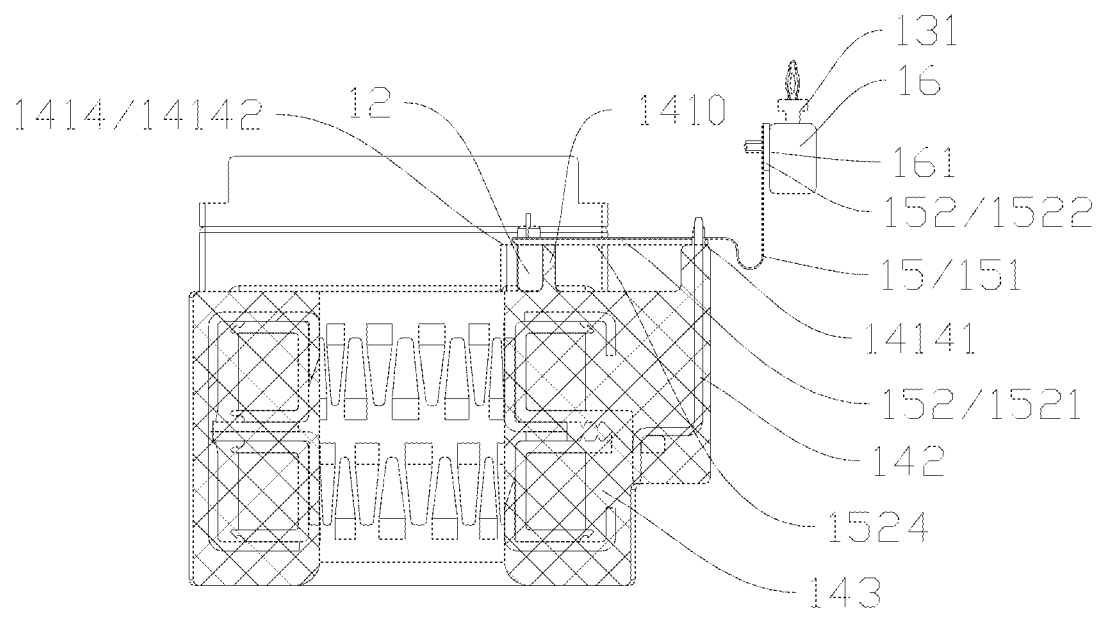
FIG. 10 is a schematic cross-sectional view of FIG. 8.
Figure 11:
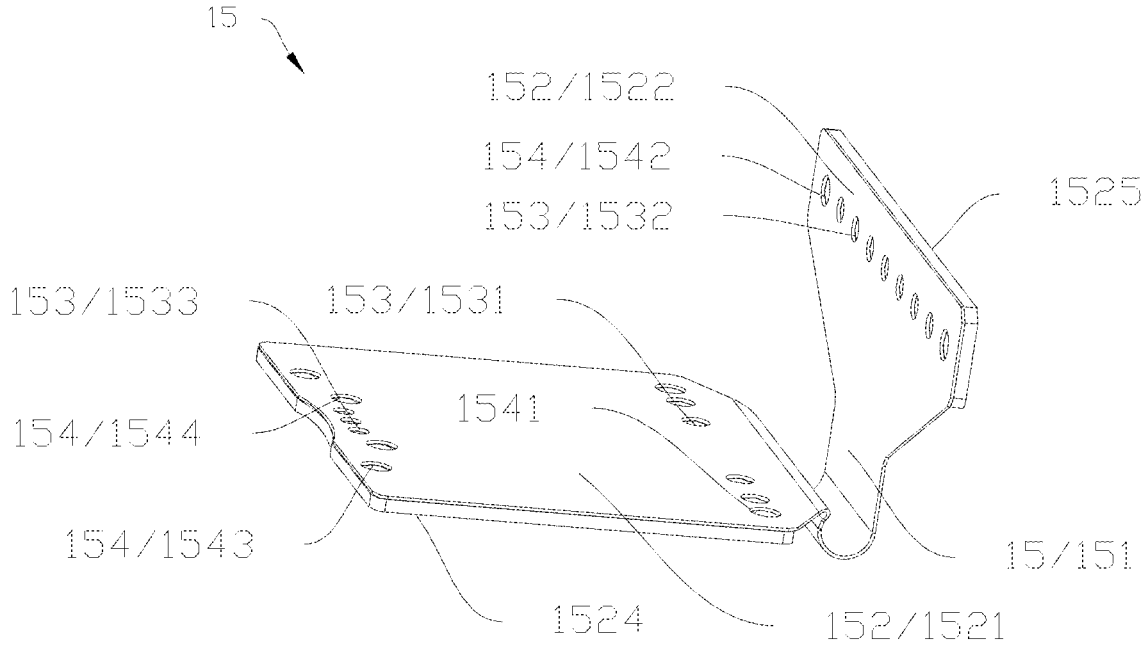
FIG. 11 is a schematic structural view showing the connector in FIG. 8.
Figure 12:
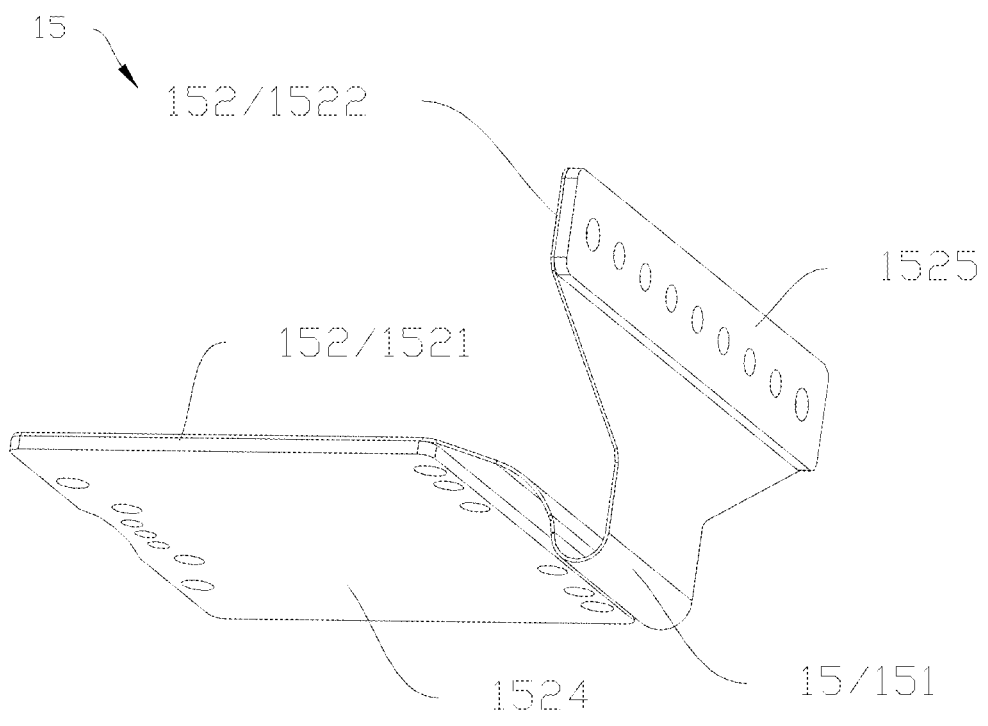
FIG. 12 is a schematic structural view showing the connector in FIG. 8 from another perspective.
Figure 13:
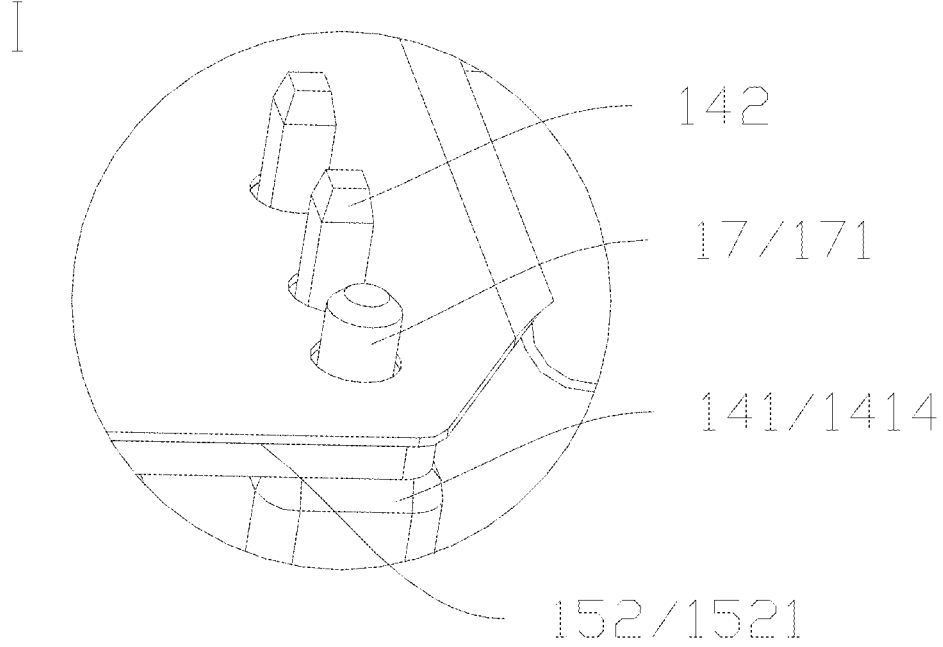
FIG. 13 is an enlarged view of a portion I in FIG. 8.

In FIG. 8 and FIG. 9, the structure of the protrusion portion 17 before welding and fixation is shown. The first protrusion portion 171 is formed by protruding outwards from the first wall 14141 in a direction perpendicular to the first wall 14141, and the first protrusion portion 171 is a cylindrical protrusion. Alternatively, the first protrusion portion 171 may be a protrusion of other shapes, such as a cuboid protrusion. A protruding height of the first protrusion portion 171 is larger than a thickness of the first segment 1521, such that at least a part of the first protrusion portion 171 is located inside the fourth hole 1541 of the first segment 1521, and the first segment 1521 is fixed on the fourth injection molded main body 1414 by the first protrusion portion 171.

Figure 14:
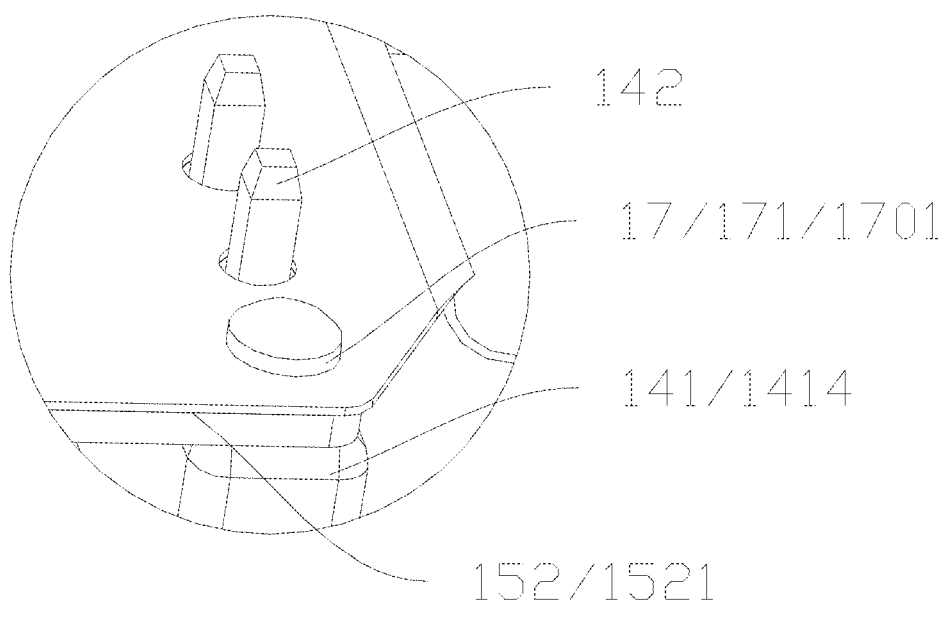
FIG. 14 is a schematic structural view showing a connection between a first protrusion portion and a rigid segment in FIG. 13.
Figure 15:
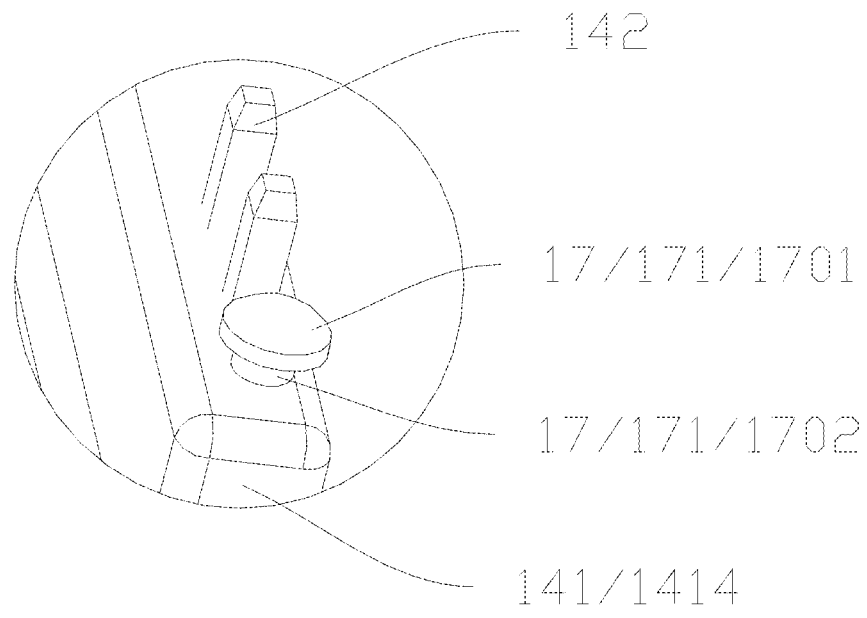
FIG. 15 is a schematic partial structural view of FIG. 14.
Figure 16:
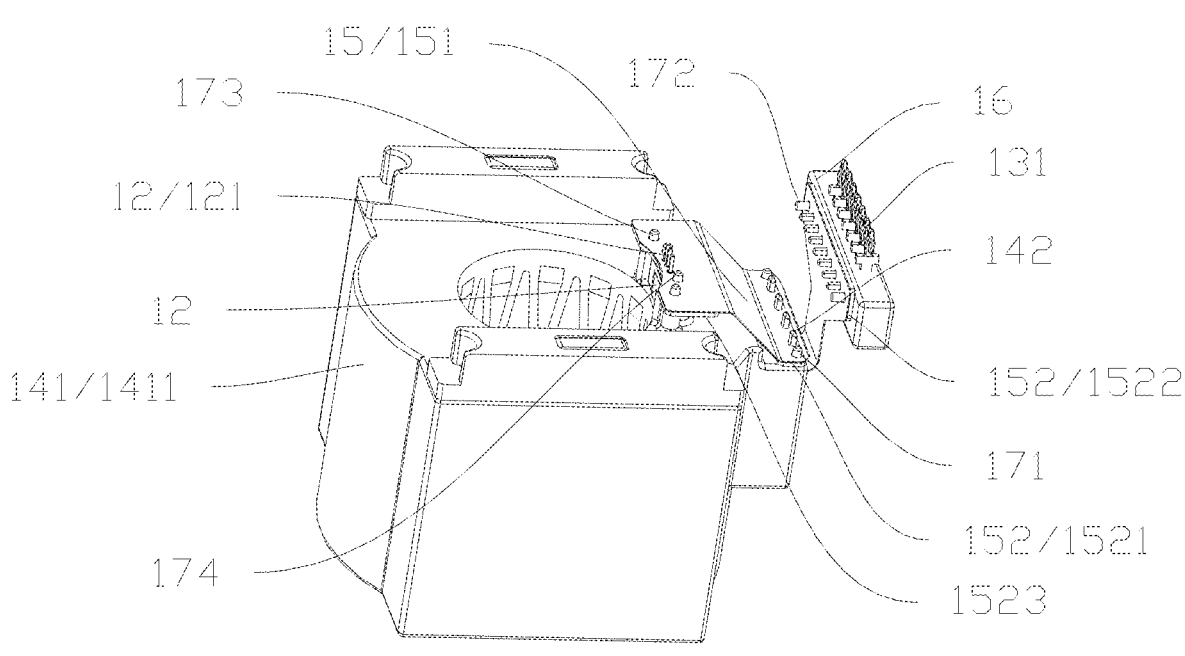
FIG. 16 is a schematic structural view showing the connector and the stator assembly in FIG. 4 according to another embodiment.
Figure 17:
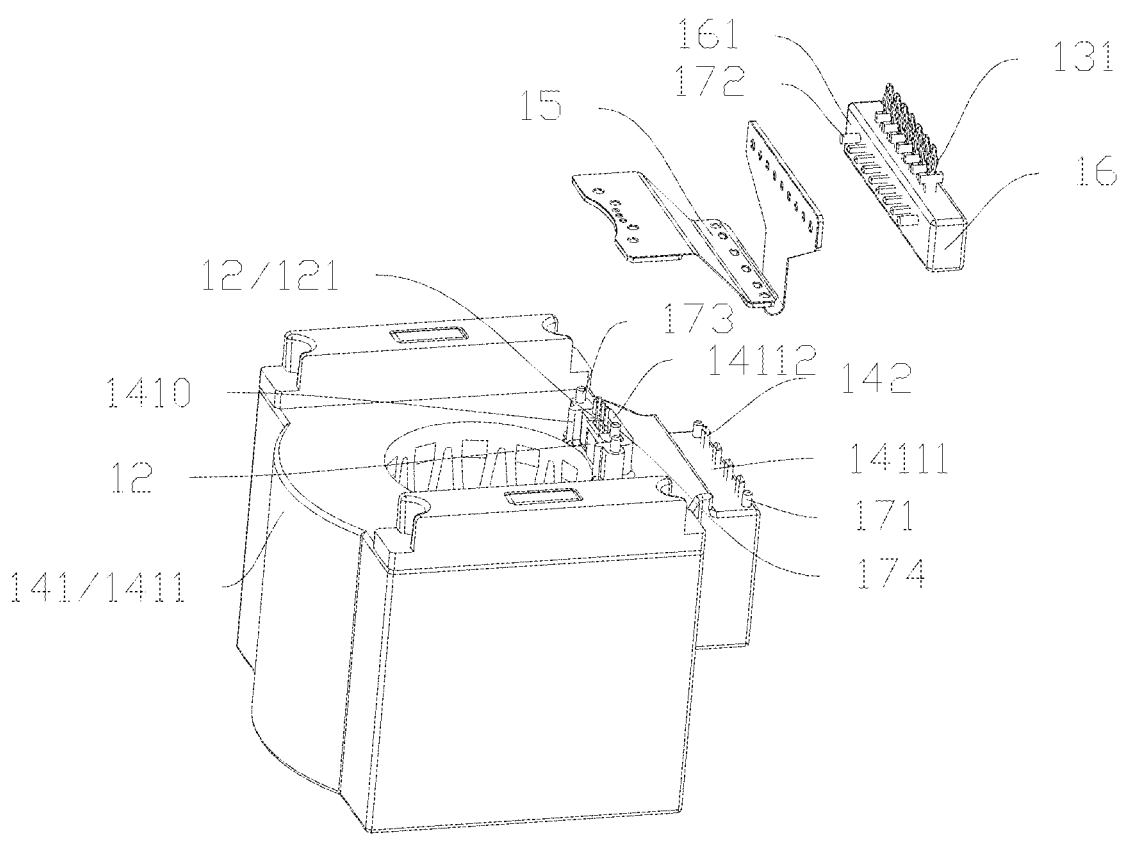
FIG. 17 is a schematic exploded view of FIG. 16.
Figure 18:
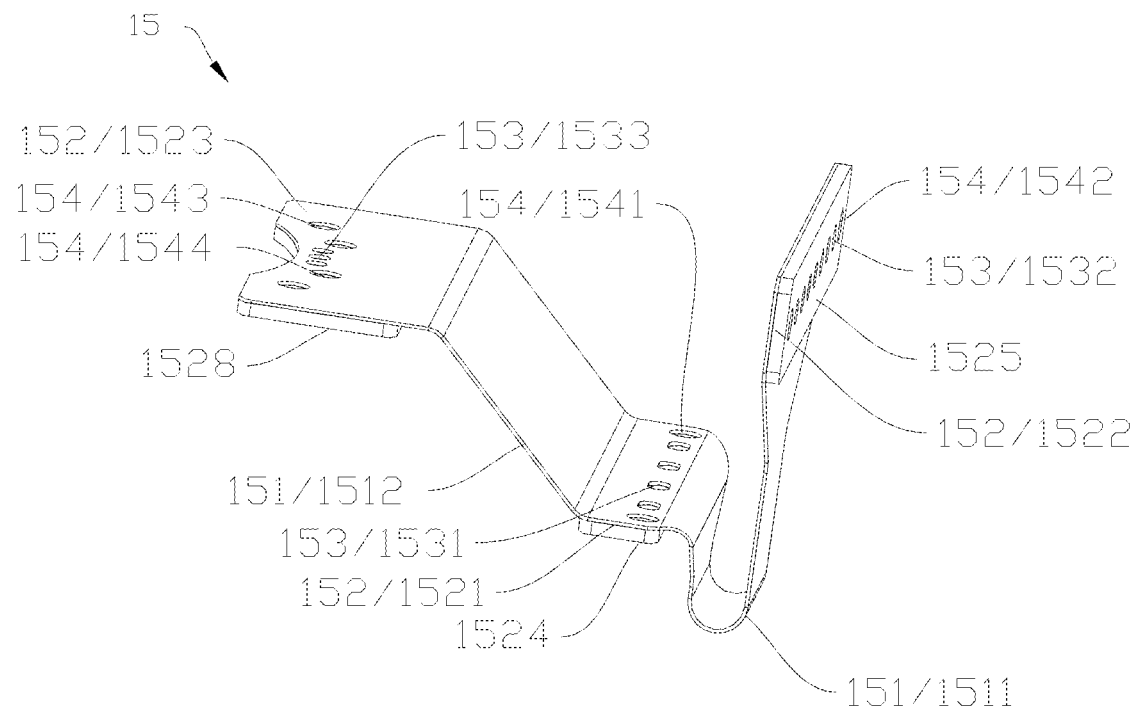
FIG. 18 is a schematic structural view showing the connector in FIG. 16.
Figure 19:
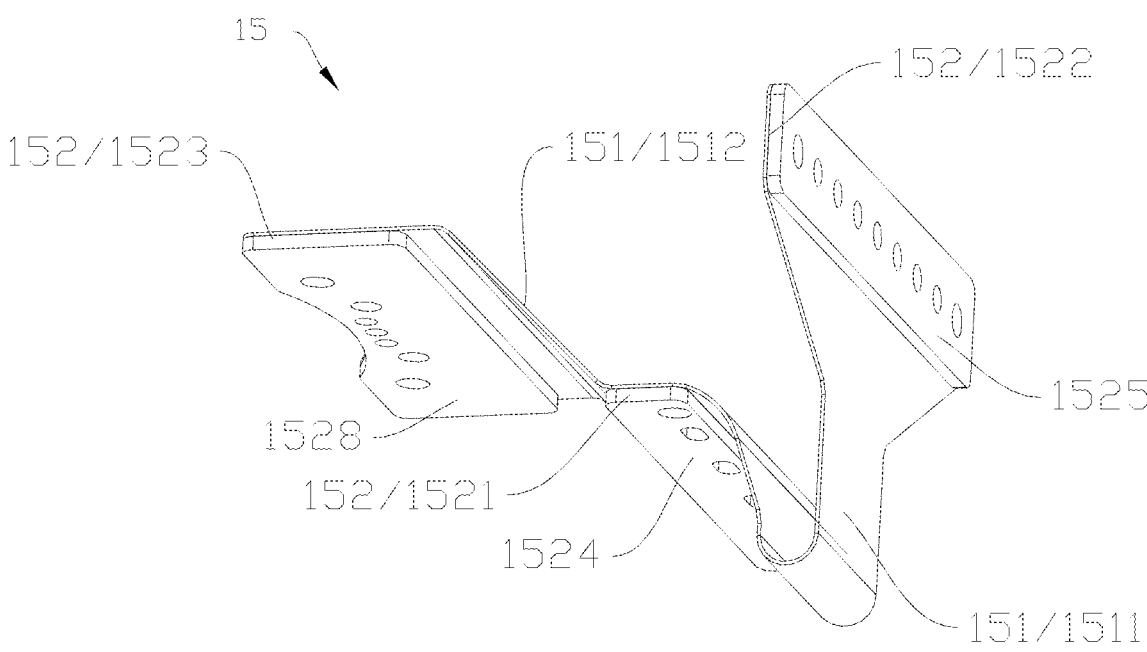
FIG. 19 is a schematic structural view showing the connector in FIG. 16 from another perspective.
Figure 20:
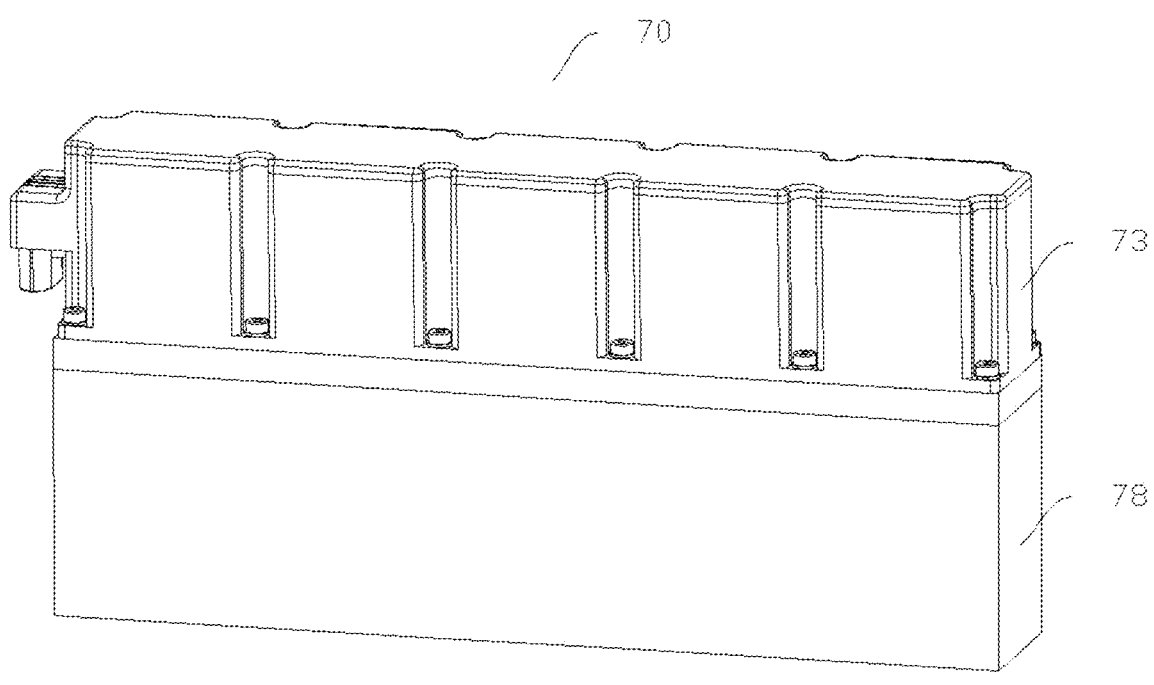
FIG. 20 is a schematic structural view showing a fluid control device according to another embodiment of the present disclosure.
Figure 21:
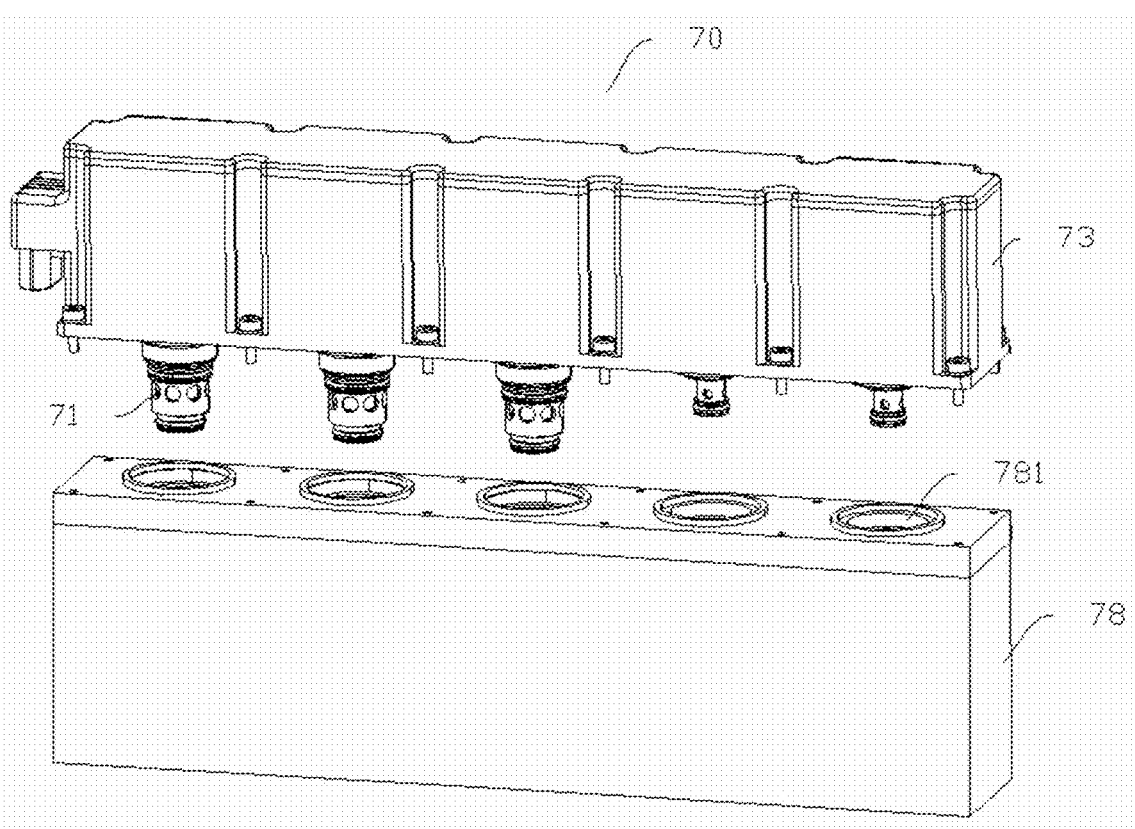
FIG. 21 is a schematic exploded view showing the fluid control device in FIG. 20.
Figures 22, 23:
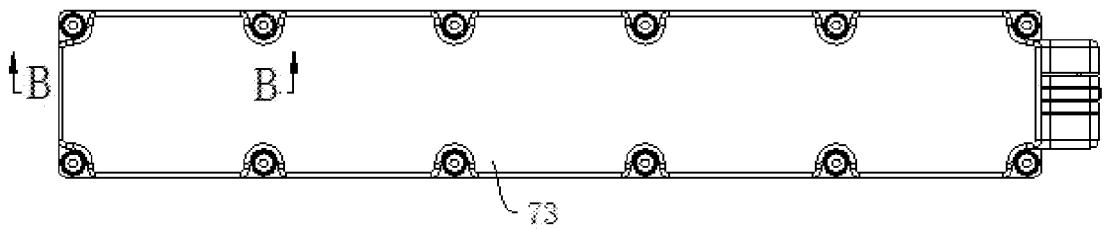
FIG. 22 is a schematic structural view in FIG. 21 with a flow passage plate being removed.
FIG. 23 is a cross-sectional view taken along a line B-B in FIG. 22.
Figure 24:
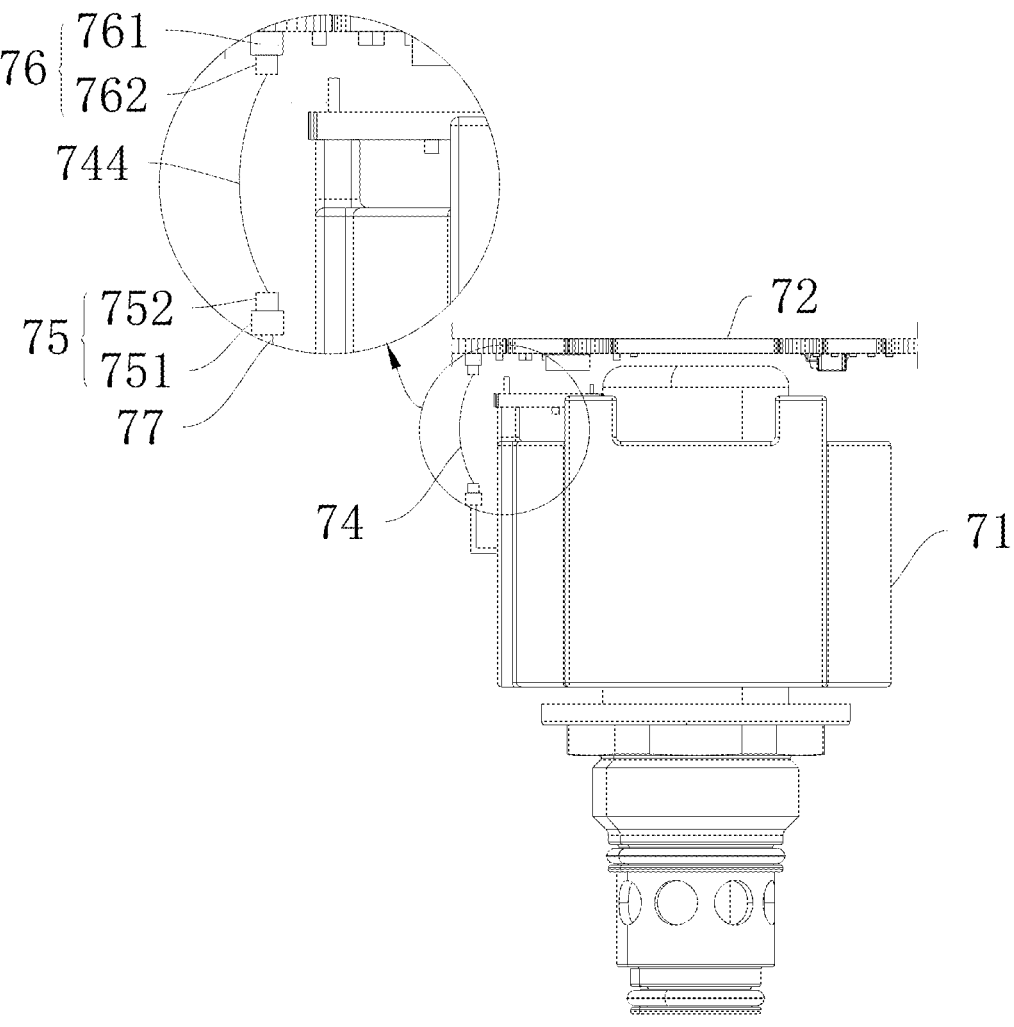
FIG. 24 is a schematic structural view showing a valve assembly, a circuit board, and a connecting portion.

In the embodiment, the first protrusion portion 171 and the first segment 1521 are connected by fusion welding. FIG. 14 and FIG. 15 are schematic views showing the specific structure of the first protrusion portion 171 and the first segment 1521 after being connected. After the first protrusion portion 171 is fused, a limiting portion 1701 is formed at a top portion of the first protrusion portion 171. The first protrusion portion 171 further includes a main body portion 1702, and a diameter of the main body portion 1702 is smaller than a diameter of the fourth hole 1541. A diameter of the limiting portion 1701 is larger than the diameter of the main body portion 1702, and the diameter of the limiting portion 1701 is larger than the diameter of the fourth hole 1541. A bottom surface of the limiting portion 1701 is in contact with a part of a top surface of the first segment 1521, to limit and fix the first segment 1521 on the fourth injection molded main body 1414. In other embodiments, the first protrusion portion 171 and the first segment 1521 may be bonded by welding, which further fixes the first segment 1521 on the fourth injection molded main body 1414.

The third protrusion portion 173 is formed by protruding outwards from the fifth wall 14142 in a direction perpendicular to the fifth wall 14142, and the third protrusion portion 173 is of a same structure with the first protrusion portion 171. The third protrusion portion 173 is connected to the first segment 1521 in a same way with the connection between the first protrusion portion 171 and the first segment 1521, which is not described in detail herein. The first protrusion portion 171 and the third protrusion portion 173 are fixedly connected to the first segment 1521, respectively, at two ends of the first segment 1521. In other embodiments, the structure of the third protrusion portion 173 may be different from the structure of the first protrusion portion 171, and the third protrusion portion 173 may be connected to the first segment 1521 in a different way from the connection between the first protrusion portion 171 and the first segment 1521.

With the protrusion portion 17, a positional relationship between the first segment 1521 and the fourth injection molded main body 1414 is further determined, and the first segment 1521 and the fourth injection molded main body 1414 are fixedly connected to each other. The first segment 1521 is of a rigid structure, and the fixed connection between the protrusion portion 17 and the first segment 1521 indirectly acts on a portion where the first segment 1521 and the first connecting portion 142 are connected to each other and on a portion where the first segment 1521 and the third connecting portion 121 are connected to each other. Therefore, the stability of the connection portions may be improved, and the portion where the first connecting portion 142 and the first segment 1521 are electrically connected to each other and the portion where the third connecting portion 121 and the first segment 1521 are electrically connected to each other are less likely to be affected by the thermal stress or the vibration during mounting, transportation, or actual operation.

The sensor 12 includes a fourth protrusion portion 174, and the second connecting hole 154 includes a seventh hole 1544. At least a part of the fourth protrusion portion 174 is located inside the seventh hole 1544. The mounting and cooperation between the sensor 12 and the first segment 1521 is limited by the fourth protrusion portion 174. Optionally, the fourth protrusion portion 174 may also be melted and then solidified to further fix the first segment 1521. The structure of the fourth protrusion portion 174 may be the same with or different from the structure of the first protrusion portion 171, and the fourth protrusion portion 174 may be connected to the first segment 1521 in a same way with or in a different way from the connection between the first protrusion portion 171 and the first segment 1521.

In the embodiment, the second connecting portion 131 is fixedly connected to the circuit board 13, specifically by pressing. The control portion 1 is further provided with a positioning block 16, and the positioning block 16 is formed by injection molding with at least a part of the second connecting portion 131 being as an insert. The positioning block 16 has a third wall 161, and the second segment 1522 of the rigid segment 152 has a fourth wall 1525. At least a part of the third wall 161 is arranged towards at least a part of the fourth wall 1525, and at least a part of the third wall 161 is in surface-to-surface contact with at least a part of the fourth wall 1525. At least a part of the second connecting portion 131 protrudes from the third wall 161. The first connecting hole 153 includes a second hole 1532, and the second hole 1532 is provided at the second segment 1522. At least a part of the second connecting portion 131 is located inside the second hole 1532. The second connecting portion 131 is a row of pins, and correspondingly, the second hole 1532 is a row of holes. As the flexible segment 151 is provided between the first segment 1521 and the second segment 1522, the positioning block 16 in FIG. 9 may be turned, such that the third wall 161 and the fourth wall 1525 are positioned in the horizontal direction. The flexible segment 151 is in an extended state, and the positioning block 16 supports the second segment 1522. The second connecting portion 131 and the second segment 1522 are connected to each other by welding. After welding, the positioning block 16 in the drawing may be turned back to a mounting position, i.e. in a state shown in FIG. 8.

At least a part of the third wall 161 is arrange towards at least a part of the fourth wall 1525, and at least a part of the third wall 161 is in surface-to-surface contact with at least a part of the fourth wall 1525. As such, the positioning block 16 can stably support the second segment 1522 during welding, to facilitate the welding and fixation between the second connecting portion 131 and the second segment 1522. Moreover, the second connecting portion 131 protrudes from the third wall 161, which facilitates the positioning of the second segment 1522, and facilitates the welding and fixation between at least a part of the second connecting portion 131 and the second segment 1522.

The positioning block 16 further includes other surfaces adjacent to or opposite to the third wall 161, and at least another part of the second connecting portion 131 protrudes from these other surfaces. At least a part of the second connecting portion 131 is located inside a connection hole on the circuit board 13, and the second connecting portion 131 is fixed on the circuit board 13 by welding. In the embodiment, the part of the second connecting portion 131 connected to the circuit board 13 protrudes from a top surface adjacent to the third wall 161. The second connecting portion 131 is an L-shaped pin, which passes through the positioning block 16.

The second protrusion portion 172 is provided on the positioning block 16, and the fifth hole 1542 is provided in the second segment 1522. At least a part of the second protrusion portion 172 is located inside the fifth hole 1542. The second protrusion portion 172 fixes the second segment 1522 onto the positioning block 16. As shown in FIG. 8 and FIG. 9, the second protrusion portion 172 is formed by protruding from the third wall 161 in a direction perpendicular to the third wall 161, and the second protrusion portion 172 is of a same structure with the first protrusion portion 171. The second protrusion portion 172 is connected to the second segment 1522 in a same way with the connection between the first protrusion portion 171 and the first segment 1521, which is not described in detail herein. Alternatively, in other embodiments, the structure of the second protrusion portion 172 may be different from the structure of the first protrusion portion 171, and the second protrusion portion 172 may be connected to the second segment 1522 in a different way from the connection between the first protrusion portion 171 and the first segment 1521.

Another embodiment of the connection between the connector and the stator assembly is shown in FIG. 16 to FIG. 19. The first stator assembly 1401, the second stator assembly 1402 and the third stator assembly 1403 are each connected to the corresponding connector 15 in a manner shown in FIG. 16 to FIG. 19. The first stator assembly 1401 is taken as an example to describe the connection relationship between the stator assembly 14 and the connector 15 hereinafter. The descriptions hereinafter mainly focus on differences with respect to the above embodiment. The rigid segment 152 further includes a third segment 1523, and the flexible segment 151 includes a fourth segment 1511 and a fifth segment 1512. The fourth segment 1511 is provided between the first segment 1521 and the second segment 1522, and the fifth segment 1512 is provided between the first segment 1521 and the third segment 1523. The fourth segment 1511 is electrically connected to the first segment 1521 and the second segment 1522, respectively, and the fifth segment 1512 is electrically connected to the first segment 1521 and the third segment 1523, respectively.

The first stator assembly 1401 includes a first injection molded main body 1411, and the first injection molded main body 1411 has a first wall 14111 and a sixth wall 14112. The first wall 14111 of the first injection molded main body 1411 is of a same structure with the first wall 14141 of the fourth injection molded main body 1414. At least a part of the first connecting portion 142 protrudes from the first wall 14111. The mounting portion 1410 has the sixth wall 14112, and the first wall 14111 and the sixth wall 14112 are a part of a top wall of the first injection molded main body 1411. At least a part of the third connecting portion 121 protrudes from the sixth wall 14112. The first wall 14111 and the sixth wall 14112 arranged in a same orientation, and the first wall 14111 and sixth wall 14112 are positioned in different planes.

The third segment 1523 has a seventh wall 1528. At least a part of the seventh wall 1528 is arranged towards at least a part of the sixth wall 14112, and at least a part of the seventh wall 1528 is in surface-to-surface contact with at least a part of the sixth wall 14112. At least a part of the second wall 1524 is arranged towards at least a part of the first wall 14111, and at least a part of the second wall 1524 is in surface-to-surface contact with at least a part of the first wall 14111.

The rigid segment 152 is provided with a first connecting hole 153 passing through the rigid segment 152. The first connecting hole 153 includes a first hole 1531 and a third hole 1533. The first hole 1531 is provided at the first segment 1521, and the third hole 1533 is provided at the third segment 1523. At least a part of the seventh wall 1528 is arranged towards at least a part of the sixth wall 14112. The first injection molded main body 1411 stably supports the third segment 1523, to facilitate the welding and fixation between the third connecting portion 121 and the third segment 1523.

The rigid segment 152 includes three segments, and the flexible segment 151 includes two segments, which are applicable to a stator assembly 14 of which the first wall 14111 and the sixth wall 14112 are in different planes that are parallel to each other. In other words, a mounting position of the sensor 12 may be adjusted within an extension range of the flexible segment 151, thereby improving the applicability of the connector 15.

The protrusion portion 17 includes a first protrusion portion 171, a second protrusion portion 172, and a third protrusion portion 173. The rigid segment 152 is provided with a second connecting hole 154, and the second connecting hole 154 includes a fourth hole 1541, a fifth hole 1542, and a sixth hole 1543. The embodiment differs from the previous embodiment in that, the first protrusion portion 171 is fixedly connected to the first segment 1521, and the third protrusion portion 173 is fixedly connected to the third segment 1523. The fourth hole 1541 is provided on the first segment 1521, and the sixth hole 1543 is provided on the third segment 1523. The first protrusion portion 171 fixes the first segment 1521 on the injection molded main body 141, and the third protrusion portion 173 fixes the third segment 1523 on the mounting portion 1410 of the injection molded main body 141.

In a specific embodiment, the number of the valve components 3 is five, and the five valve components 3 are linearly arranged. Each valve component 3 is in correspondence to the respective stator assembly 14, and each stator assembly 14 is electrically connected to the circuit board 13 through the corresponding connector 15. Two different kinds of connection relationships between the stator assembly 14 and the connector 15 are described above. In summary, the stator assembly 14, the sensor 12, the connector 15, the positioning block 16, and the second connecting portion 131 are in one-to-one correspondence to each other, which are linearly arranged inside the accommodation chamber 111 of the housing 11 and electrically connected to the circuit board 13.

The positioning block 16 and the housing 11 are connected with each other in a fixed or limited manner. In the embodiment, the housing 11 includes a positioning portion 112. The positioning portion 112 is located at a side of the stator assembly 14 where the positioning block 16 is provided, and the positioning portion 112 protrudes inward in a direction perpendicular to a side wall surface of the housing 11. The positioning portion 112 and the injection molded main body 141 of the stator assembly 14 do not interfere with each other. The positioning portion 112 includes a positioning groove 113. The positioning groove 113 is formed by being concave from an upper surface of the positioning portion 112. A part of the positioning block 16 is located in the positioning groove 113 in a limited manner, and the positioning block 16 and the housing 11 are connected with each other in a limited manner. Specifically, five positioning blocks 16 are linearly arranged, which are limited and fixed in the five positioning grooves 113 of the housing 11, respectively. The positioning portions 112 and the positioning grooves 113 are arranged in one-to-one correspondence with the positioning blocks 16. It should be noted that each stator assembly 14 is provided with a set of positioning portions 112 and positioning grooves 113, which are symmetric arranged with respect to an arrangement direction of the stator assemblies 14, so as to limit and fix two end portions of the corresponding positioning block 16. The third wall 161 of the positioning block 16 is perpendicular to the arrangement direction of the stator assemblies 14.

The positioning block 16 is arranged to position the second connecting portion 131, and the multiple positioning blocks 16 are arranged to position multiple second connecting portions 131 in a one single horizontal plane. The circuit board 13 is parallel to the horizontal plane of the housing 11, which facilitates of connecting all the multiple stator assemblies 14 with the circuit board 13 by pressing. Moreover, each positioning block 16 is formed by injection molding with at least a part of the corresponding second connecting portion 131 being as an insert. The positioning block 16 support the corresponding second connecting portion 131 to prevent the corresponding second connecting portion 131 from moving downwards under force, thereby improving the efficiency of the process of pressing connection.

Figure 6:
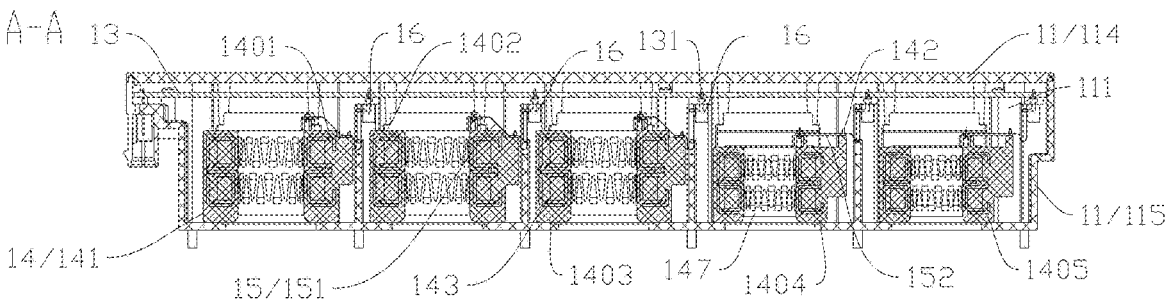
FIG. 6 is a schematic cross-sectional view of the control portion along a line A-A in FIG. 5.

Along the arrangement direction of the stator assemblies 14, each positioning block 16 is located at the same side of the corresponding stator assembly 14, each connector 15 is located at the same side of the corresponding stator assembly 14, and each sensor 12 is located at the same side of the corresponding stator assembly 14. That is, as shown in FIG. 6, each positioning block 16, each connector 15, and each sensor 12 are all located at the right side of the corresponding stator assembly 14. As such, the cooperation and mounting between the stator assemblies 14 and the housing 11 can be standardized, which is further beneficial to the standardized design of the circuit board 13.

As shown in FIG. 6, along the arrangement direction of the stator assemblies 14, a size of an injection molded main body 141 of each solenoid valve is larger than a size of an injection molded main body 141 of each throttle valve. To achieve the standardized design of the circuit board 13, a distance between adjacent connection holes on the circuit board 13 is consistent. A total length of the control portion 1 is mainly determined by the arrangement of the injection molded main bodies 141, and thus the stator assemblies 14 having a large size have to be arranged compactly. In the embodiment, the circuit board 13 is located higher than the stator assembly 14, and each positioning block 16 is located closer to the circuit board 13 than the stator assembly 14. That is, the second connecting portion 131 is closer to the circuit board 13 than the first connecting portion 142. The positioning block 16 supports the second connecting portion 131 to be connected to the circuit board 13, and the second connecting portion 131 is connected to the corresponding connector 15. The connector 15 is connected to the first stator assembly 1401. A projection of the positioning block 16 overlaps with a projection of the second stator assembly 1402 on a bottom side of the housing 11. Along the arrangement direction of the stator assemblies 14, the first stator assembly 1401 is adjacent to the second stator assembly 1402, and the positioning block 16 is located between the first stator assembly 1401 and the second stator assembly 1402. Similarly, a projection of another positioning block 16 overlaps with a projection of the third stator assembly 1403 on the bottom side of the housing 11. The positioning block 16 makes full use of an internal space of the control portion 1, making the structure of the control portion 1 more compact, thereby achieving the miniaturization of the fluid control assembly 100. In other embodiments, to realize the miniaturization of the control portion 1, a projection of any other positioning block 16 may overlap with a projection of an adjacent stator assembly 14 on the bottom side of the housing 11. Alternatively, a projection of the connector 15 may overlap with a projection of an adjacent stator assembly 14 on the bottom side of the housing 11.

The second connecting portion 131 is arranged closer to the circuit board 13 than the first connecting portion 142. That is, the second segment 1522 and the first segment 1521 differ in heights. The second connecting portion 131 is an L-shaped pin, and the second connecting portion 131 passes through the positioning block 16. The third wall 161 and the first wall 14141 are perpendicular to each other, and the second wall 1524 and the fourth wall 1525 of the connector 15 are perpendicular to each other. As such, the flexible segment 151 is bent only once to make the first segment 1521 and the second segment 1522 on both sides of the flexible segment 151 be electrically connected to the first connecting portion 142 and the second connecting portion 131 respectively. The flexible segment 151 only undergoes one bending stress, thereby increasing the service life of the connector 15 and improving the operation performance of the connector 15.

As shown in FIG. 20 to FIG. 24, in another embodiment of the present disclosure, a fluid control device 70 is provided, which is applicable to a thermal management system (for example, a vehicle thermal management system). The fluid control device 70 includes a housing 73, a circuit board 72, and at least one valve assembly 71. The valve assembly 71 includes a stator assembly 711, and at least a part of the stator assembly 711 is located inside the housing 73. The fluid control device 70 further includes a connecting portion 74, and the connecting portion 74 includes a first fixed segment 741, a second fixed segment 742, and a connecting portion 743. The first fixed segment 741 is fixedly connected to the stator assembly 711, and the second fixed segment 742 is fixedly connected to the circuit board 72. The connecting portion 743 is located between the first fixed segment 741 and the second fixed segment 742, and the connecting portion 743 is provided with a flexible segment 744.

When the temperature of the fluid control device 70 changes, the circuit board 72 and the valve assembly 71 may expand or contract, and thus the relative positions at the connection between the first fixed segment 741 and the stator assembly 711 and at the connection between the second fixed segment 742 and the circuit board 72 may change. At this time, the flexible segment 744 is deformed. The flexible segment 744 absorbs a thermal stress and a thermal deformation of the circuit board 72 and the valve assembly 71, so as to reduce the stress concentration at positions of a fixation position between the connecting portion 74 and the valve assembly 71 and a fixation position between connecting portion 74 and the circuit board 72 due to thermal expansion or contraction, thereby improving the stability and reliability of the connection between the connecting portion 74 and the circuit board 72 and the connection between the connecting portion 74 and the valve assembly 71.

In the embodiment, the flexible segment 744 is a lead wire or a flat cable. The fluid control device 70 further includes a first connector 75 and a second connector 76. The flexible segment 744 is fixedly connected to the valve assembly 71 through the first connector 75, and the flexible segment 744 is fixedly connected to the circuit board 72 through the second connector 76. For an easy connection between the first connector 75 and the valve assembly 71, the fluid control device 70 further includes a pin 77. The pin 77 is fixedly connected to the stator assembly 711, and the first connector 75 is located between the pin 77 and the flexible segment 744.

Specifically, the first connector 75 includes a first female connector 751 and a first male connector 752. The first female connector 751 is fixedly connected to the pin 77, and the first male connector 752 is fixedly connected to the flexible segment 744. When the first female connector 751 and the first male connector 752 are coupled to each other by plug-in, the connecting portion 74 and the valve assembly 71 can be electrically connected or signal-connected with each other. The second connector 76 includes a second female connector 761 and a second male connector 762. The second female connector 761 is fixedly connected to the circuit board 72, and the second male connector 762 is fixedly connected to the flexible segment 744. When the second female connector 761 and the second male connector 762 are connected to each other by plug-in, the connecting portion 74 and the circuit board 72 can be electrically connected or signal-connected with each other.

In the embodiment, the fluid control device 70 further includes a flow passage plate 78, and each valve assembly 71 and the flow passage plate 78 may be fixedly connected, connected in a limited manner, or detachably connected with each other. The flow passage plate 78 is provided with at least one mounting chamber 781. The number of the mounting chamber 781 is the same with the number of the valve assembly 71, and a part of each valve assembly 71 is located inside the corresponding mounting chamber 781.

The technical features of the above embodiments can be combined in any way. In order to make the description concise, not all possible combinations of the technical features of the above embodiments are described. These combinations of the technical features belong to the scope of the description of this specification as long as they do not contradict each other. When the technical features in different embodiments are embodied in the same drawing, the drawing is also regarded as disclosing any combination of each related embodiment at the same time. It should be noted that, the above embodiments are only used to describe the present disclosure, and are not intended to limit the technical solutions described in the present disclosure, such as the directional definitions such as "front", "back", "left", "right", "up", "down" and the like. Although the present disclosure is described in detail in this specification with reference to the above embodiments, it should be understood by those skilled in the art that, any modifications or equivalent substitutions may be made to the present disclosure by those skilled in the art, and all technical solutions and improvements without departing from the spirit and scope of the present disclosure are deemed to fall into the scope of the claims of the present disclosure.

The invention claimed is:

1. A fluid control assembly, comprising a control portion, wherein the control portion comprises a circuit board, a stator assembly, and a connector;

the connector comprises a flexible segment and a rigid segment, and the flexible segment is electrically connected to the rigid segment;

the stator assembly comprises a coil assembly and a first connecting portion, and a coil of the coil assembly is electrically connected to the first connecting portion; and the circuit board comprises a second connecting portion, wherein the rigid segment comprises a first segment, and the first segment is electrically connected to the first connecting portion; and/or the rigid segment comprises a second segment, and the second segment is electrically connected to the second connecting portion, wherein the stator assembly comprises an injection molded main body, the injection molded main body is formed by injection molding with at least the coil assembly and the first connecting portion being as inserts, and the injection molded main body has a first wall;

the first segment is of a plate structure, the first segment has a second wall, at least a part of the first wall is arranged towards at least a part of the second wall, and the first segment is provided with a first hole; and at least a part of the first connecting portion protrudes from the first wall, at least a part of the first connecting portion is located inside the first hole, and the first connecting portion is fixedly connected to the first segment, wherein at least a part of the first wall is in surface-to-surface contact with at least a part of the second wall.

2. The fluid control assembly according to claim 1, wherein the control portion comprises a positioning block, the positioning block is formed by injection molding with at least a part of the second connecting portion being as an insert, and the positioning block comprises a third wall;

the second segment is of a plate structure, the second segment has a fourth wall, at least a part of the third wall is arranged towards at least a part of the fourth wall, and the second segment is provided with a second hole; and at least a part of the second connecting portion protrudes from the third wall, at least a part of the second connecting portion is located inside the second hole, and the second connecting portion is fixedly connected to the second segment.

3. The fluid control assembly according to claim 2, wherein the first segment is fixed to the first connecting portion by welding, and the second segment is fixed to the second connecting portion by welding; and the flexible segment is provided between the first segment and the second segment, the flexible segment is electrically connected to the first segment, and the flexible segment is electrically connected to the second segment.

4. The fluid control assembly according to claim 3, wherein the control portion comprises a sensor, the injection molded main body comprises a mounting portion, and the sensor is fixed or limited in a mounting groove of the mounting portion;

the mounting portion has a fifth wall, the sensor comprises a third connecting portion, and the third connecting portion protrudes from the fifth wall;

the first wall and the fifth wall are arranged in a same orientation, the first wall and the fifth wall are located in a same plane, and at least a part of the fifth wall is arranged towards at least a part of the second wall; and the first segment is provided with a third hole, at least a part of the third connecting portion is located inside the third hole, and the first segment is fixed to the third connecting portion by welding.

5. The fluid control assembly according to claim 4, wherein the injection molded main body comprises a first protrusion portion and a third protrusion portion, and the positioning block comprises a second protrusion portion;

the rigid segment is provided with a second connecting hole, the second segment is provided with a fifth hole, and at least a part of the second protrusion portion is located inside the fifth hole;

the first segment is provided with a fourth hole and a sixth hole, at least a part of the first protrusion portion is located inside the fourth hole, and at least a part of the second protrusion portion is located inside the sixth hole, or the first segment is provided with the fourth hole, and the third segment is provided with the sixth hole, at least a part of the first protrusion portion is located inside the fourth hole, and at least a part of the second protrusion portion is located inside the sixth hole;

the protrusion portion comprises a limiting portion and a main body portion, and the first protrusion portion, the second protrusion portion, and the third protrusion portion each comprises the limiting portion and the main body portion;

the limiting portion is arranged away from the injection molded main body farther than the main body portion, and the limiting portion has a diameter larger than a diameter of the second connecting hole; and the first segment and/or the third segment is connected to the injection molded main body by the limiting portion in a fixed or limited manner, or the second segment is connected to the injection molded main body by the limiting portion in a fixed or limited manner.

6. The fluid control assembly according to claim 5, wherein the fluid control assembly comprises a plurality of valve components, the stator assembly of the control portion comprises a plurality of stator assemblies and the connector of the control portion comprises a plurality of connectors;

the plurality of stator assemblies are in one-to-one correspondence to the plurality of valve components, the plurality of stator assemblies are in one-to-one correspondence to the plurality of connectors, and the plurality of valve components are linearly arranged;

the control portion comprises a housing, and the housing is provided with an accommodation chamber; and the plurality of stator assemblies are located inside the accommodation chamber and are linearly arranged, the circuit board and the plurality of connectors are located inside the accommodation chamber, and each of the plurality of stator assemblies is electrically connected to the circuit board through a corresponding one of the plurality of connector.

7. The fluid control assembly according to claim 6, wherein the positioning block of the control portion comprises a plurality of positioning blocks and the second connecting portion of the control portion comprises a plurality of second connecting portions, the plurality of positioning blocks are in one-to-one correspondence to the plurality of second connecting portions, and the plurality of second connecting portions are in one-to-one correspondence to the plurality of connectors;

the plurality of positioning blocks are linearly arranged, and the plurality of positioning blocks are connected to the housing in a fixed or limited manner; and each of the plurality of connectors is electrically connected to the circuit board through a corresponding one of the plurality of second connecting portions, and each corresponding one of the plurality of connectors and each corresponding one of the plurality of positioning blocks are located at a same side of a corresponding one of the plurality of stator assemblies.

8. The fluid control assembly according to claim 7, wherein the circuit board is located higher than the plurality of stator assemblies, and the plurality of second connecting portions are located closer to the circuit board than the first connecting portions;

the plurality of stator assemblies comprise a first stator assembly and a second stator assembly, and the first stator assembly and the second stator assembly of each stator assembly are adjacent to each other along an arrangement direction of the plurality of stator assemblies; and one of the plurality of the corresponding connectors, one of the plurality of second connecting portions, the first connecting portion of one of the plurality of stator assemblies, and one of the plurality of positioning blocks are arranged corresponding to the first stator assembly, the one of the plurality of positioning blocks is located between the first stator assembly and the second stator assembly of each stator assembly, and a projection of the one of the plurality of positioning blocks on a bottom side of the housing overlaps with a projection of the second stator assembly on the bottom side of the housing.

9. The fluid control assembly according to claim 8, wherein each of the plurality of second connecting portions is an L-shaped pin, which passes through a corresponding one of the plurality of positioning blocks, and the third wall of each of the plurality of positioning blocks is perpendicular to the first wall.

10. The fluid control assembly according to claim 3, wherein the control portion comprises a sensor, the injection molded main body comprises a mounting portion, and the sensor is fixed or limited in a mounting groove of the mounting portion;

the mounting portion has a sixth wall, the sensor comprises a third connecting portion, and the third connecting portion protrudes from the sixth wall;

the first wall and the sixth wall are arranged in a same orientation, and the first wall and the sixth wall are arranged in different planes that are parallel to each other, respectively;

the rigid segment comprises a third segment, the flexible segment comprises a plurality of segments and one of the plurality of segments of the flexible segment is provided between the third segment and the first segment;

the third segment has a seventh wall, and at least a part of the seventh wall is arranged towards at least a part of the sixth wall; and the third segment is provided with a third hole, at least a part of the third connecting portion is located inside the third hole, and the third segment is fixed to the third connecting portion by welding.

11. The fluid control assembly according to claim 10, wherein the injection molded main body comprises a first protrusion portion and a third protrusion portion, and the positioning block comprises a second protrusion portion;

the rigid segment is provided with a second connecting hole, the second segment is provided with a fifth hole, and at least a part of the second protrusion portion is located inside the fifth hole;

the first segment is provided with a fourth hole and a sixth hole, at least a part of the first protrusion portion is located inside the fourth hole, and at least a part of the second protrusion portion is located inside the sixth hole, or the first segment is provided with the fourth hole, and the third segment is provided with the sixth hole, at least a part of the first protrusion portion is located inside the fourth hole, and at least a part of the second protrusion portion is located inside the sixth hole;

the protrusion portion comprises a limiting portion and a main body portion, and the first protrusion portion, the second protrusion portion, and the third protrusion portion each comprises the limiting portion and the main body portion;

the limiting portion is arranged away from the injection molded main body farther than the main body portion, and the limiting portion has a diameter larger than a diameter of the second connecting hole; and the first segment and/or the third segment is connected to the injection molded main body by the limiting portion in a fixed or limited manner, or the second segment is connected to the injection molded main body by the limiting portion in a fixed or limited manner.

* * * * *